(12) United States Patent
Granberg et al.

(10) Patent No.: US 10,830,317 B1
(45) Date of Patent: Nov. 10, 2020

(54) RATCHET MILL ASSEMBLIES

(71) Applicants: Erik Granberg, Pleasant Hill, CA (US); Marc A. Magarin, Sparks, NV (US)

(72) Inventors: Erik Granberg, Pleasant Hill, CA (US); Marc A. Magarin, Sparks, NV (US)

(73) Assignee: Granberg Pump and Meter Ltd., Pittsburg, CA (US)

( * ) Notice: Subject to any disclaimer, the term of this patent is extended or adjusted under 35 U.S.C. 154(b) by 0 days.

(21) Appl. No.: 16/195,457

(22) Filed: Nov. 19, 2018

(51) Int. Cl.
*F16H 19/04* (2006.01)
*F16H 31/00* (2006.01)
*B27B 17/00* (2006.01)

(52) U.S. Cl.
CPC ......... *F16H 19/04* (2013.01); *B27B 17/0041* (2013.01); *B27B 17/0083* (2013.01); *F16H 31/002* (2013.01)

(58) Field of Classification Search
CPC ......... B27B 17/0083; B27B 9/02; B27B 9/04; Y10T 83/722; Y10T 83/8763; Y10T 83/7101; Y10T 83/68; F16H 19/04; F16H 31/002; B23D 47/02; B23D 51/02; B23D 49/167
USPC ............ 83/813, 574, 794, 745; 30/371, 373
See application file for complete search history.

(56) References Cited

U.S. PATENT DOCUMENTS

| | | | | | |
|---|---|---|---|---|---|
| 3,225,799 | A | * | 12/1965 | Hayden | B27B 17/0083 30/371 |
| 3,889,560 | A | * | 6/1975 | MacFadyen | B27B 5/22 83/872 |
| 4,070,757 | A | * | 1/1978 | Granberg | B27B 17/0083 30/371 |
| 4,122,604 | A | * | 10/1978 | Brown | B23Q 9/0028 30/371 |
| 4,134,203 | A | * | 1/1979 | Grube | B23Q 9/0028 30/371 |
| 4,332,084 | A | * | 6/1982 | Lovas | B23Q 9/0028 30/380 |
| 4,640,170 | A | * | 2/1987 | Bakken | B27B 17/0091 30/371 |
| 5,046,391 | A | * | 9/1991 | Lewis | B23D 45/024 144/376 |
| 5,125,290 | A | * | 6/1992 | Cotter | F16H 19/04 184/99 |

(Continued)

*Primary Examiner* — Evan H MacFarlane
(74) *Attorney, Agent, or Firm* — Kevin Roe

(57) ABSTRACT

Ratchet mill assemblies to permit precise horizontal cutting, one ratchet mill assembly comprising: a shaft with polygonal cross-section, wherein the shaft with polygonal cross-section can rotate and is supported by bearing brackets where each bearing bracket is attached to an end bracket; a handle bar coupled to end brackets by a handle boss on each end bracket; two pinion sprockets coupled to the shaft with polygonal cross-section; and two depth posts, each depth post having depth markings, and each depth post having a corresponding end bracket held in place on the corresponding depth post by a post clamp, wherein at least one post clamp is secured and tightened by way of a half U-bolt and a toggle lock clamp, wherein each pinion sprocket engages rack holes on a corresponding depth post to allow movement of a corresponding end bracket up and down the corresponding depth post.

17 Claims, 25 Drawing Sheets

(56) References Cited

U.S. PATENT DOCUMENTS

| | | | | |
|---|---|---|---|---|
| 5,213,022 A | * | 5/1993 | Elgan | B23D 53/04 |
| | | | | 83/797 |
| 8,276,493 B2 | * | 10/2012 | Dale | B23D 55/02 |
| | | | | 83/788 |
| 2012/0037276 A1 | * | 2/2012 | Granberg | B27B 1/00 |
| | | | | 144/378 |

* cited by examiner

RATCHET MILL ASSEMBLIES

BACKGROUND OF THE INVENTION

Description of the Prior Art

On-site precise cutting of any material is difficult and dangerous, but still frequently very desirable. For example, portable sawmills have proliferated due to their convenience in cutting lumber on-site and the resulting avoidance of the necessity of transporting logs significant distances to conventional sawmills.

However, prior art portable sawmills are typically limited in making either horizontally or vertically aligned cuts, but are not constructed to easily allow precise cutting of logs in horizontal planes. And prior art portable sawmills are typically incapable of both horizontally and vertically aligned cuts without very dangerous, and time-consuming binding and turning operations by operators that also decrease the accuracy and repeatability of the cuts.

In view of the foregoing, what is needed is an improved ratchet mill assembly to provide a safer and more accurate cutting mill.

BRIEF DESCRIPTION OF THE DRAWINGS

Non-limiting and non-exhaustive embodiments of the invention are described with reference to the following figures.

DETAILED DESCRIPTION OF PREFERRED EMBODIMENTS

The invention provides a method and apparatus to provide a ratchet mill assembly that provides precise horizontal planes to precisely cut materials on-site. For example, one embodiment of the invention can be comprised in a portable sawmill that can cut lumber in precise orthogonal vertical and horizontal planes. It should be noted that other embodiments of the invention can be adapted and used to cut plastic, polymers, fiber materials, metals or equivalent materials other than lumber. Alternative embodiments may or may not use extruded aluminum or aluminum alloys that are machined. Alternative embodiments could use other materials to implement the invention, such as various steel or magnesium alloys or equivalent materials having sufficient strength and rigidity.

The following embodiments of a ratchet mill assembly make adjusting the cutting height easier for portable sawmills. In the prior art, in order to adjust a portable mill for cutting height in horizontal planes, the operator must loosen bolts holding a post clamp against a riser post. Using accurate end brackets, the operator can loosen the bolts just enough to move the end brackets up and down and the end brackets tend to stay in place until the operator moves them. In prior art portable sawmills, with end brackets which were not CNC machined, the operator had to loosen the clamps so much that the end brackets would be loose and hard for one operator to adjust the portable sawmill. With the two end brackets tied together with the ratchet mill assembly, one operator can easily adjust the sawmill up and down, and since the end brackets are tied together with a hex shaft (or any polygonal or circular cross-section shaft), both sides move equally. In summary, it is easier to adjust a portable sawmill by one operator, whereas the prior art required two people to adjust a portable sawmill for cutting in horizontal planes. Various embodiment of the ratchet mill assembly will allow one person do the adjustments on a portable sawmill.

Figure 1A:
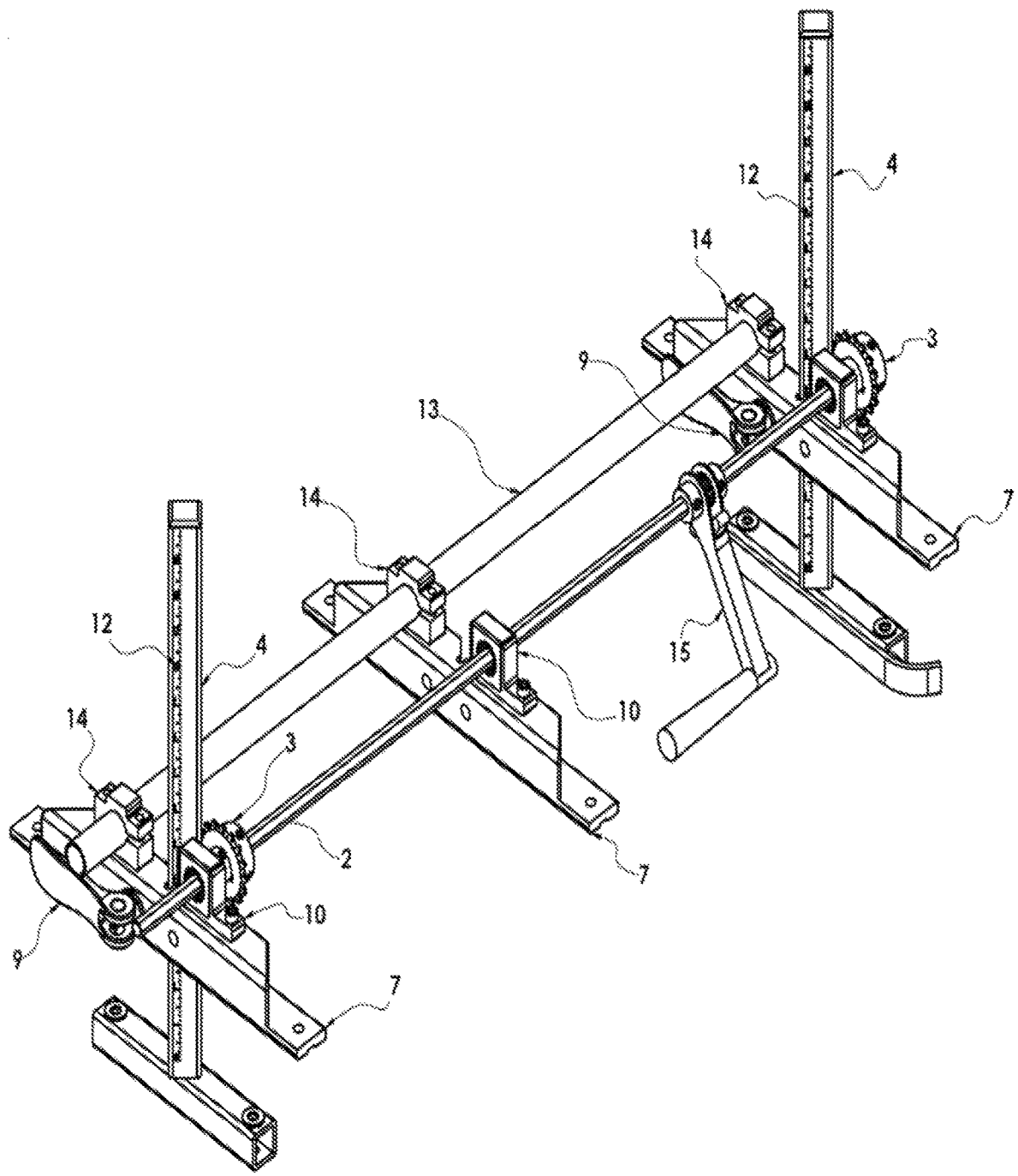
FIG. 1A illustrates a top-left isometric view of a ratchet mill assembly, in accordance with a first embodiment of the invention.

FIG. 1A illustrates a top-left isometric view of a ratchet mill assembly, in accordance with a first embodiment of the invention. This view includes a pinion sprocket 3, depth post 4, and depth markings 12. The pinion sprocket 3 is fixed to the hex shaft 2. The hex shaft 2 is free to rotate and is supported by bearing brackets 10 attached to each end bracket 7. Depth post 4 is held in place between post clamp 6 and end bracket 7. The post clamp 6 is secured and tightened by way of a half U-bolt 8 and the toggle lock clamp 9. The handle bar 13 is connected to the end bracket 7 by way of the handle boss 14. The pinion sprocket 3 engages the rack holes 11 on the depth post 4 in order to move the end bracket 7 up and down locations along the depth post 4. The handle 15 allows the user to rotate the hex shaft 2 while making small increments. In alternative embodiments of the invention, the hex shaft 2 could be a shaft with any polygonal or circular cross-section besides a hexagonal cross-section. The longitudinal axis of the hex shaft 2 extends axially through the center of the hex shaft 2, and the longitudinal axis of the handle 15 extends radially outward from the hex shaft 2.

In one embodiment of the invention, in order to use this assembly for adjusting the height of the end bracket 7, the user disengages the toggle lock clamp 9 in order to release tension on the half U-bolt 8 and post clamp 6 which allows for free movement of the end bracket 7 in a vertical direction along the depth post 4. The user then grips the handle 15 and rotates the hex shaft 2 which in turn rotates the pinion sprocket 3, moving the end bracket 7 to the desired height location indicated by the depth markings 12. The handle 15 is rotated in partial turns as the ratchet mechanism locks the position in place as the user returns the handle 15 for another cycle. This process is repeated until the desired height is reached. The user then proceeds to reengage the toggle lock clamps 9, locking the end bracket 7 at the desired height. The assembly length is able to be adjusted by sliding the end brackets 7 closer together or father apart.

Figure 1B:
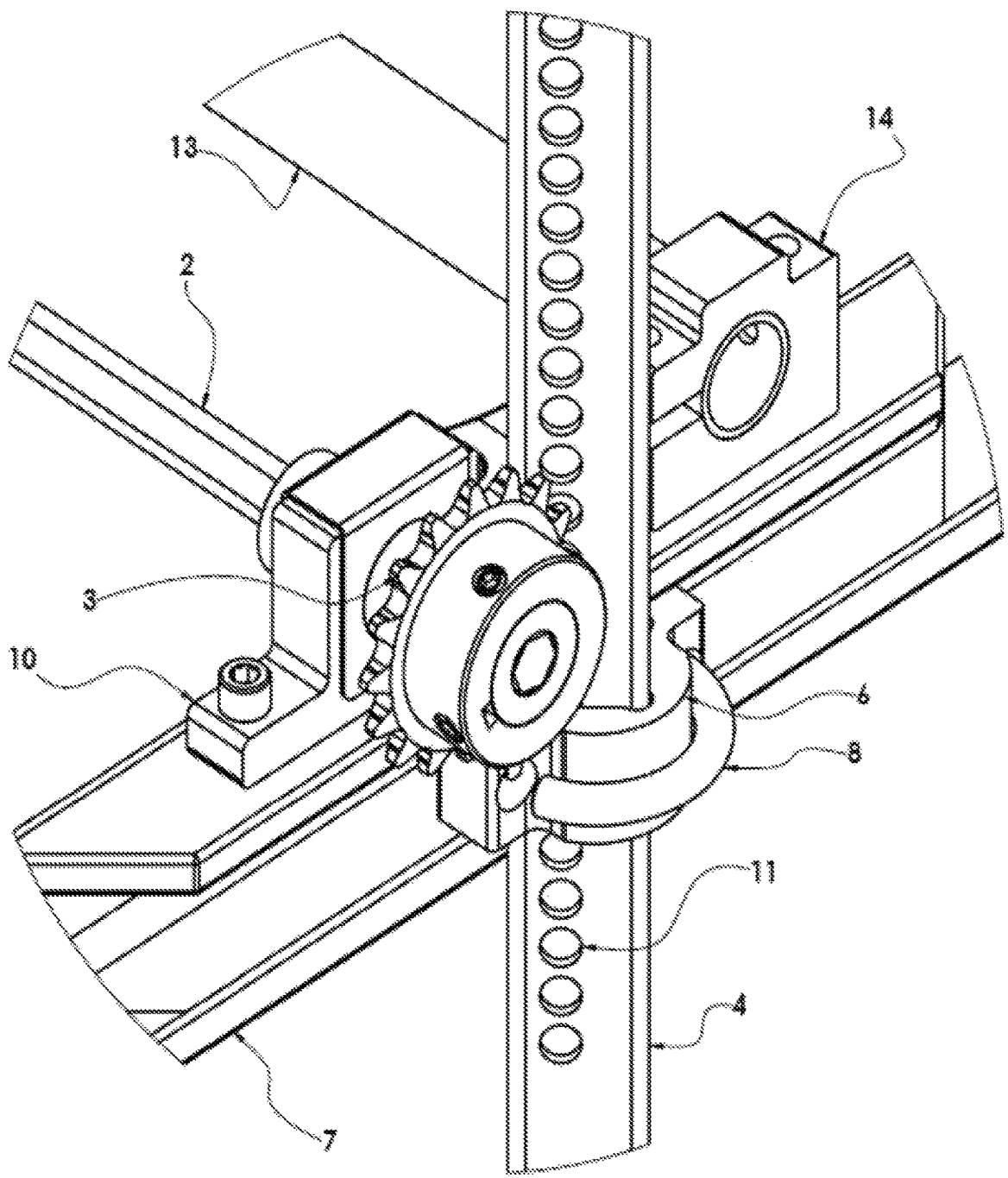
FIG. 1B illustrates a right-side magnified isometric view of a ratchet mill assembly in more detail, in accordance with a first embodiment of the invention.

FIG. 1B illustrates a right-side magnified isometric view of a ratchet mill assembly in more detail, in accordance with a first embodiment of the invention. This view includes a pinion sprocket 3, depth post 4, and rack holes 11. The pinion sprocket 3 is fixed to the hex shaft 2. The hex shaft 2 is free to rotate and is supported by bearing brackets 10 attached to each end bracket 7. Depth post 4 is held in place between post clamp 6 and end bracket 7. The post clamp 6 is secured and tightened by way of a half U-bolt 8 and the toggle lock clamp 9. The handle bar 13 is connected to the end bracket 7 by way of the handle boss 14. The pinion sprocket 3 engages the rack holes 11 on the depth post 4 in order to move the end bracket 7 up and down locations along the depth post 4.

Figure 1C:
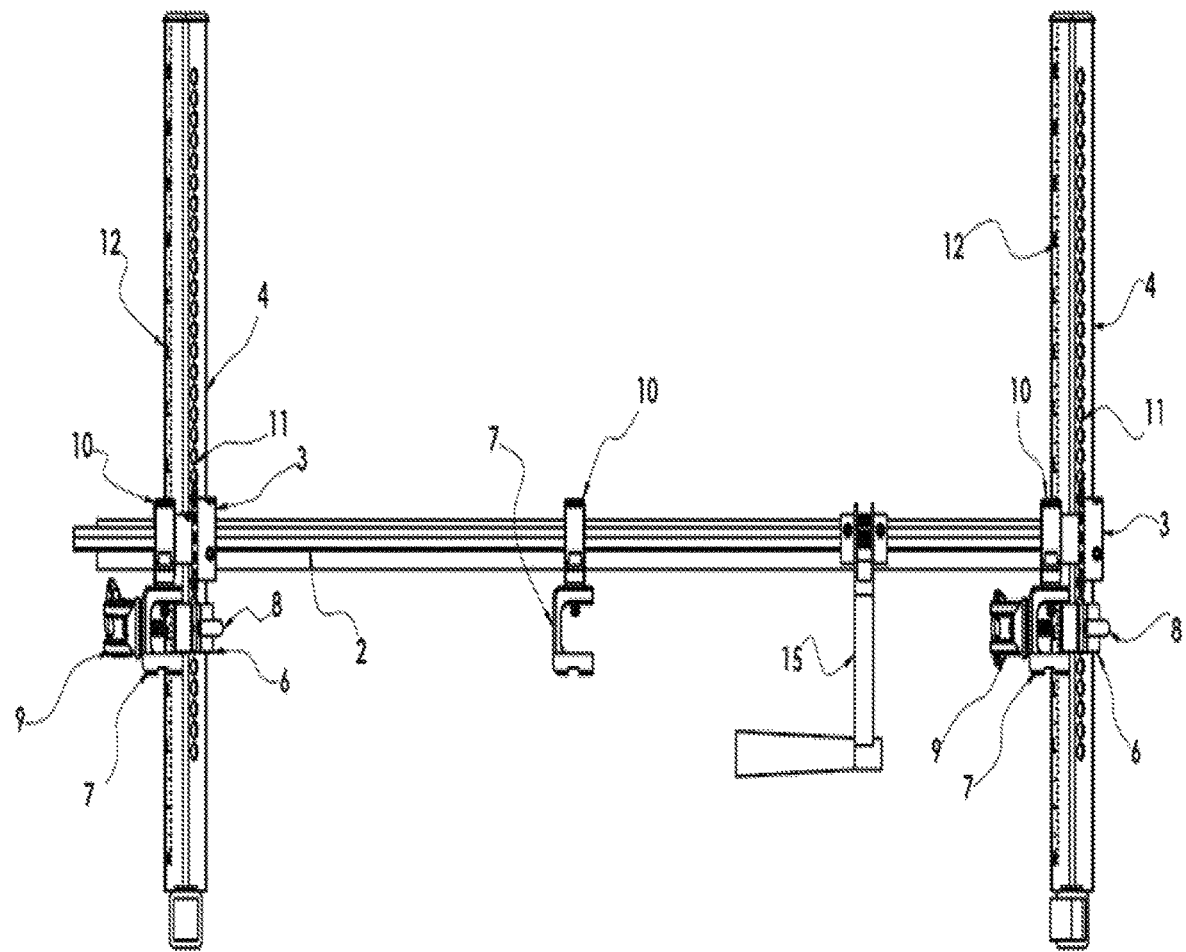
FIG. 1C illustrates a horizontal side view of a ratchet mill assembly, in accordance with a first embodiment of the invention.

FIG. 1C illustrates a horizontal side view of a ratchet mill assembly, in accordance with a first embodiment of the invention. This view is not to scale and includes a pinion sprocket 3, depth post 4, rack holes 11, and depth markings 12. The pinion sprocket 3 is fixed to the hex shaft 2. The hex shaft 2 is free to rotate and is supported by bearing brackets 10 attached to each end bracket 7. Depth post 4 is held in place between post clamp 6 and end bracket 7. The post clamp 6 is secured and tightened by way of a half U-bolt 8 and the toggle lock clamp 9. The handle bar 13 is connected to the end bracket 7 by way of the handle boss 14. The pinion sprocket 3 engages the rack holes 11 on the depth post 4 in order to move the end bracket 7 up and down locations along the depth post 4. The handle 15 allows the user to rotate the hex shaft 2 while making small increments.

Figure 1D:
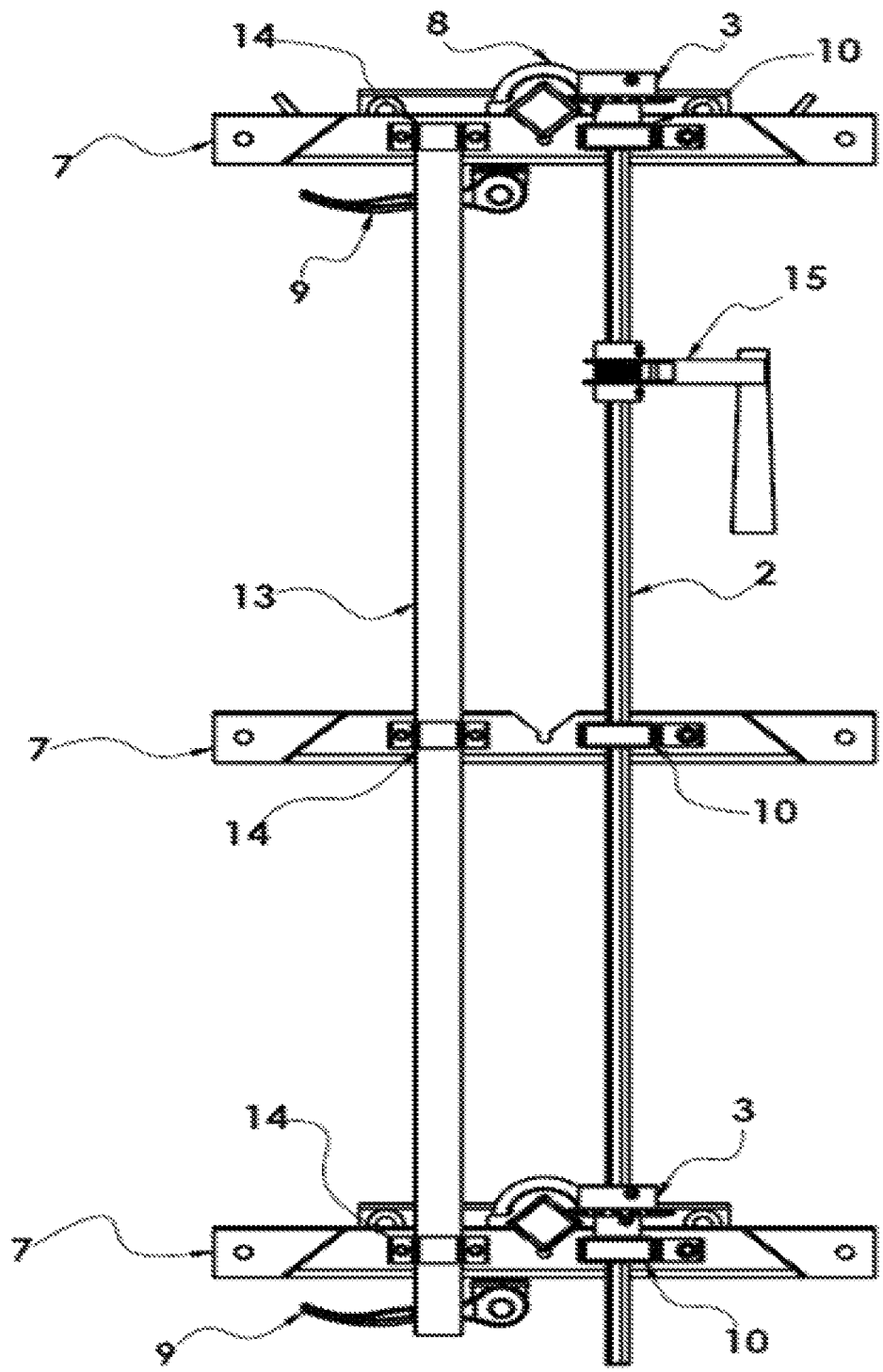
FIG. 1D illustrates a top down view of a ratchet mill assembly, in accordance with a first embodiment of the invention.

FIG. 1D illustrates a top down view of a ratchet mill assembly, in accordance with a first embodiment of the invention. This view is not to scale and includes a pinion sprocket 3 fixed to the hex shaft 2. The hex shaft 2 is free to rotate and is supported by bearing brackets 10 attached to each end bracket 7. Shown are a half U-bolt 8 and the toggle lock clamp 9. The handle bar 13 is connected to the end bracket 7 by way of the handle boss 14. The handle 15 allows the user to rotate the hex shaft 2 while making small increments.

Figure 1E:
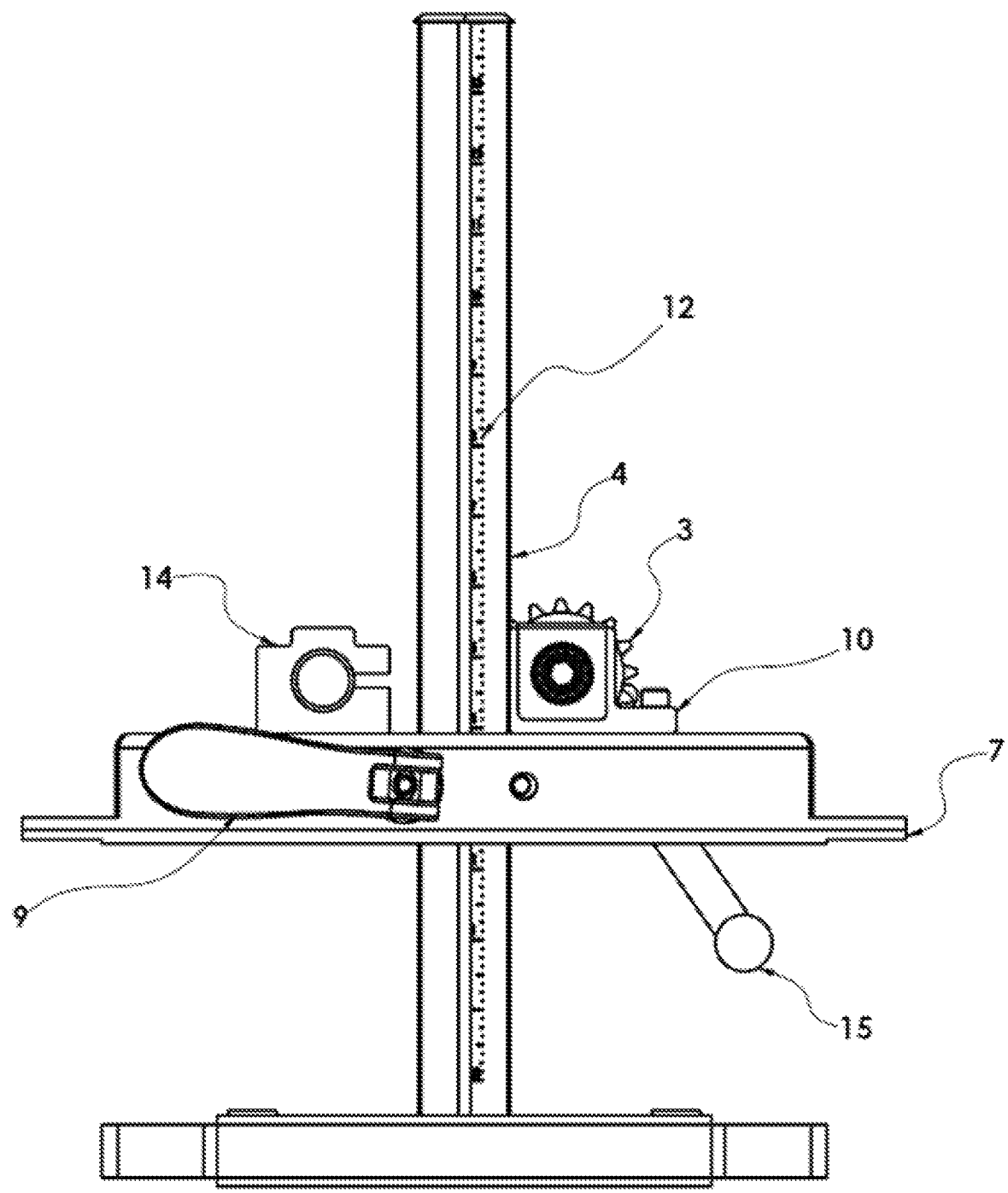
FIG. 1E illustrates a direct side view of the toggle lock clamp side of the ratchet mill assembly, in accordance with a first embodiment of the invention.

FIG. 1E illustrates a direct side view of the toggle lock clamp side of a rack and pinion assembly, in accordance with a first embodiment of the invention. This view includes a pinion sprocket 3, depth post 4, and depth markings 12. The bearing bracket 10 is attached to an end bracket 7, which also has a handle boss 14, and a toggle lock clamp 9. The pinion sprocket 3 engages the rack holes (not shown) on the depth post 4 in order to move the end bracket 7 up and down locations along the depth post 4. The handle 15 allows the user to rotate the hex shaft (not shown) while making small increments.

Figure 2A:
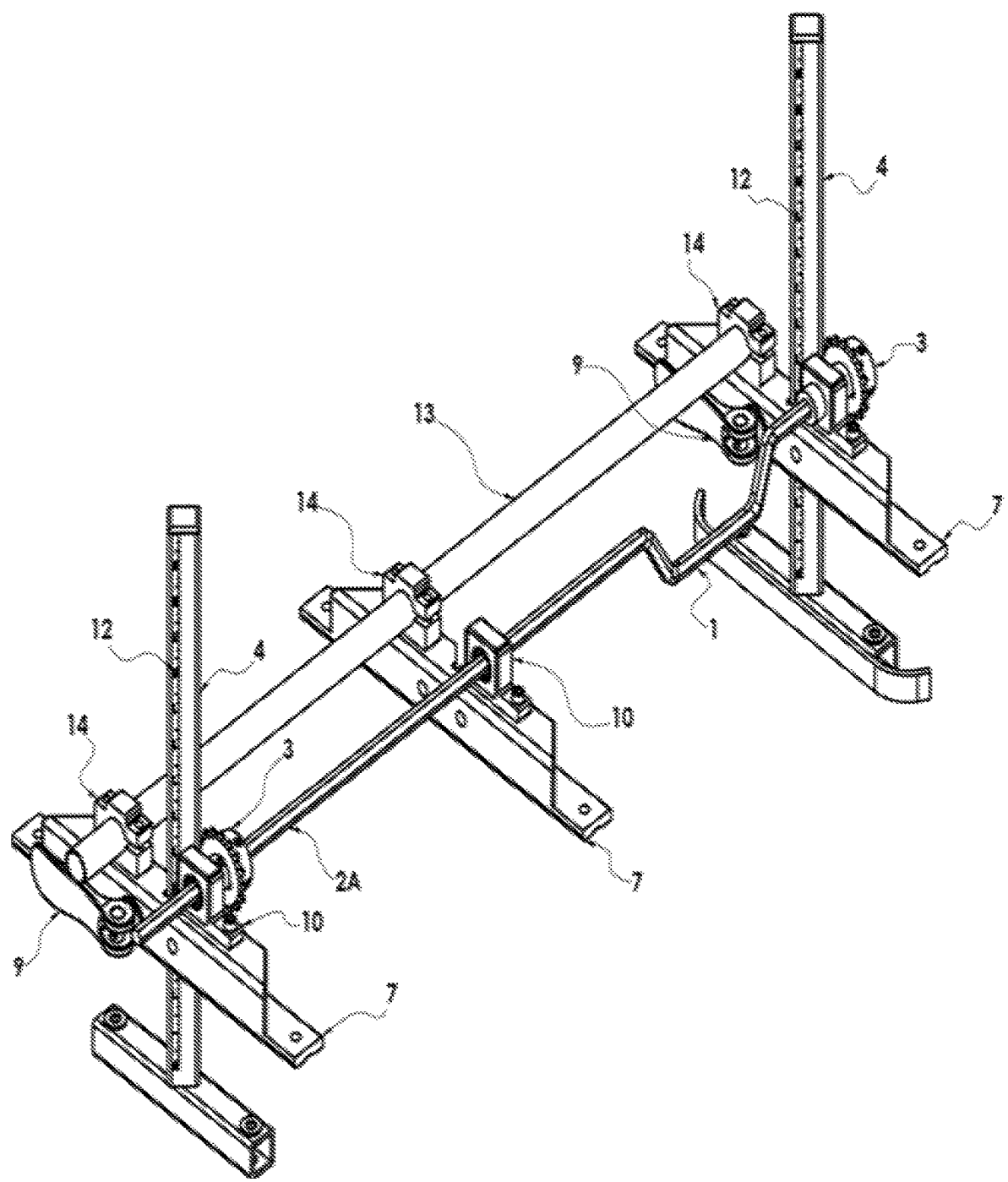
FIG. 2A illustrates a top-left isometric view of a ratchet mill assembly, in accordance with a second embodiment of the invention.

FIG. 2A illustrates a top-left isometric view of a ratchet mill assembly, in accordance with a second embodiment of the invention. This view is not to scale and includes a pinion sprocket 3, depth post 4, and depth markings 12. The pinion sprocket 3 is fixed to the hex shaft 2A. The hex shaft 2A is free to rotate and is supported by bearing brackets 10 attached to each end bracket 7. Depth post 4 is held in place between post clamp 6 and end bracket 7. The post clamp 6 is secured and tightened by way of a half U-bolt 8 and the toggle lock clamp 9. The pinion sprocket 3 engages the rack holes (not shown) on the depth post 4 in order to move the end bracket 7 up and down locations along the depth post 4. The handle bar 13 is connected to the end bracket 7 by way of the handle boss 14. The handle bend 1 allows the user to rotate the hex shaft 2A.

In one embodiment of the invention, in order to use this assembly for adjusting the height of the end bracket 7, the user disengages the toggle lock clamp 9 in order to release tension on the half U-bolt 8 and post clamp 6 which allows for free movement of the end bracket 7 in a vertical direction along the depth post 4. The user then grips the handle bend 1 and rotates the hex shaft 2A which in turn rotates the pinion sprocket 3, moving the end bracket 7 to the desired height location indicated by the depth markings 12. The user then proceeds to reengage the toggle lock clamps 9, locking the end bracket 7 at the desired height while holding the handle bend 1 at a fixed position. The assembly length is able to be adjusted by sliding the end brackets 7 closer together or father apart.

Figure 2B:
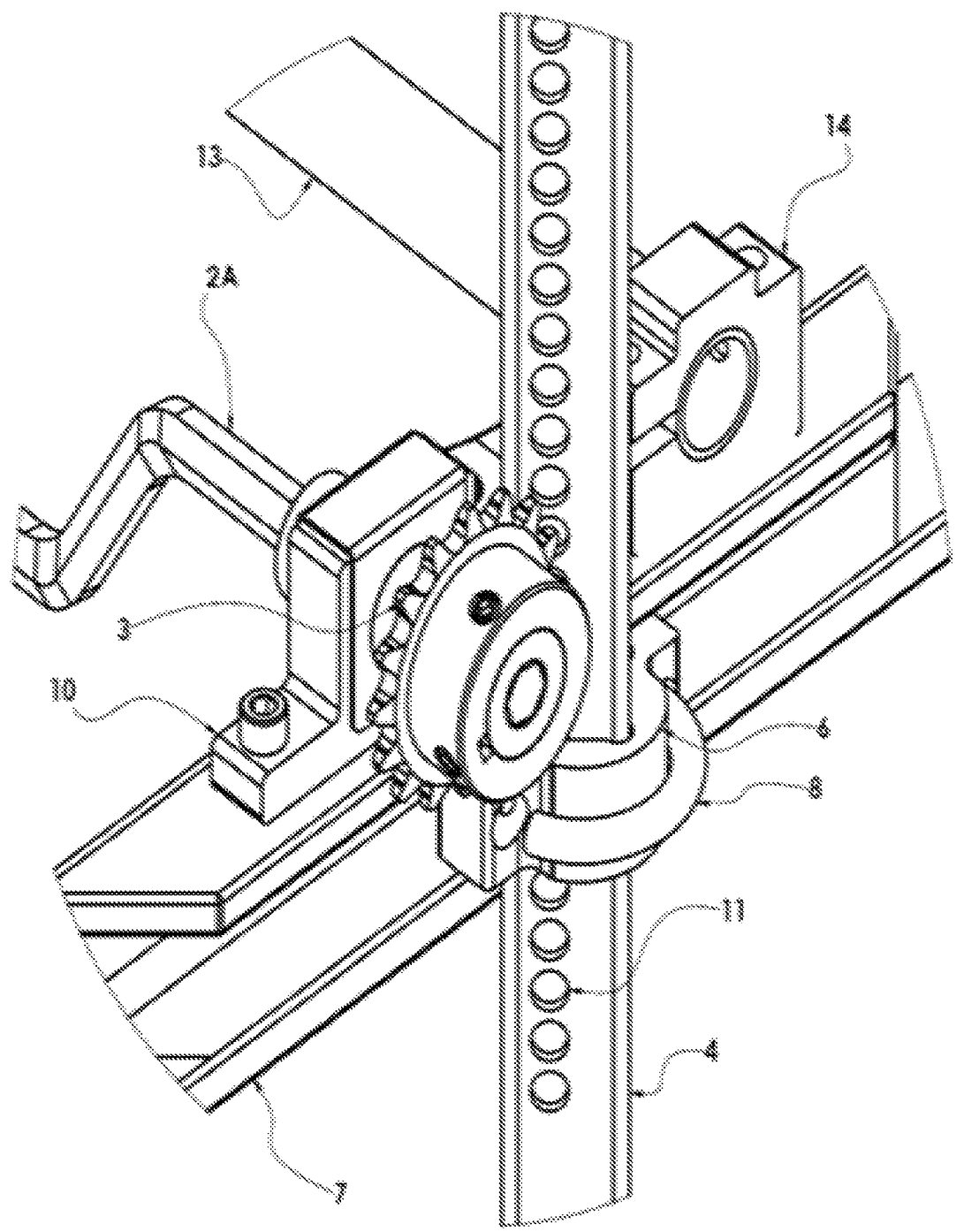
FIG. 2B illustrates a right-side magnified isometric view of a ratchet mill assembly in more detail, in accordance with a second embodiment of the invention.

FIG. 2B illustrates a right-side magnified isometric view of a ratchet mill assembly in more detail, in accordance with a second embodiment of the invention. This view in not to scale and includes a pinion sprocket 3, depth post 4, and rack holes 11. The pinion sprocket 3 is fixed to the hex shaft 2A. The hex shaft 2A is free to rotate and is supported by bearing brackets 10 attached to each end bracket 7. Depth post 4 is held in place between post clamp 6 and end bracket 7. The post clamp 6 is secured and tightened by way of a half U-bolt 8 and the toggle lock clamp 9. The handle bar 13 is connected to the end bracket 7 by way of the handle boss 14. The pinion sprocket 3 engages the rack holes 11 on the depth post 4 in order to move the end bracket 7 up and down locations along the depth post 4.

Figure 2C:
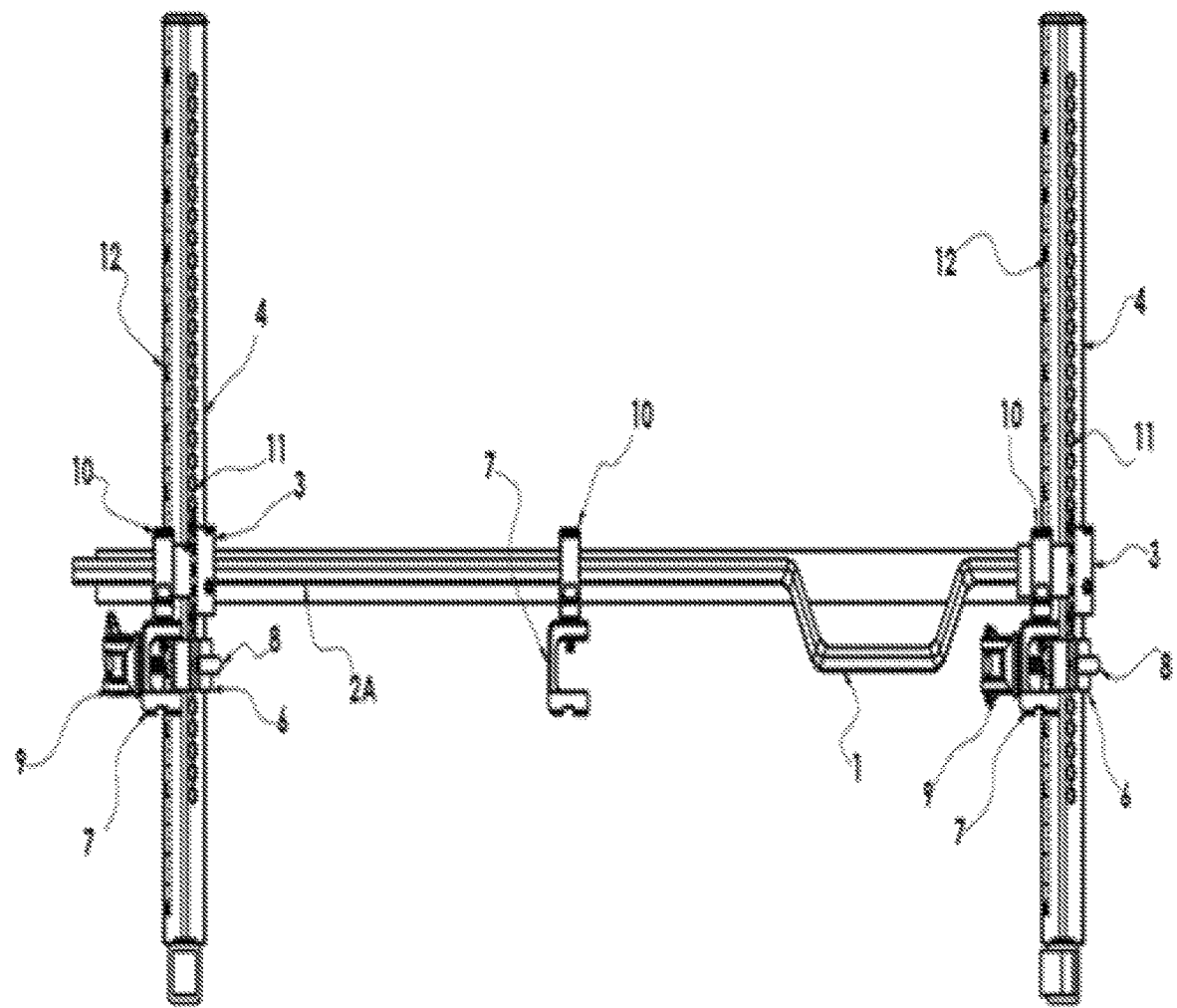
FIG. 2C illustrates a horizontal side view of a ratchet mill assembly, in accordance with a second embodiment of the invention.

FIG. 2C illustrates a horizontal side view of a ratchet mill assembly, in accordance with a second embodiment of the invention. This view is not to scale and includes a pinion sprocket 3, depth post 4, rack holes 11, and depth markings 12. The pinion sprocket 3 is fixed to the hex shaft 2A. The hex shaft 2A is free to rotate and is supported by bearing brackets 10 attached to each end bracket 7. Depth post 4 is held in place between post clamp 6 and end bracket 7. The post clamp 6 is secured and tightened by way of a half U-bolt 8 and the toggle lock clamp 9. The handle bar 13 is connected to the end bracket 7 by way of the handle boss 14. The pinion sprocket 3 engages the rack holes 11 on the depth post 4 in order to move the end bracket 7 up and down locations along the depth post 4. The handle bend 1 allows the user to rotate the hex shaft 2A.

Figure 2D:
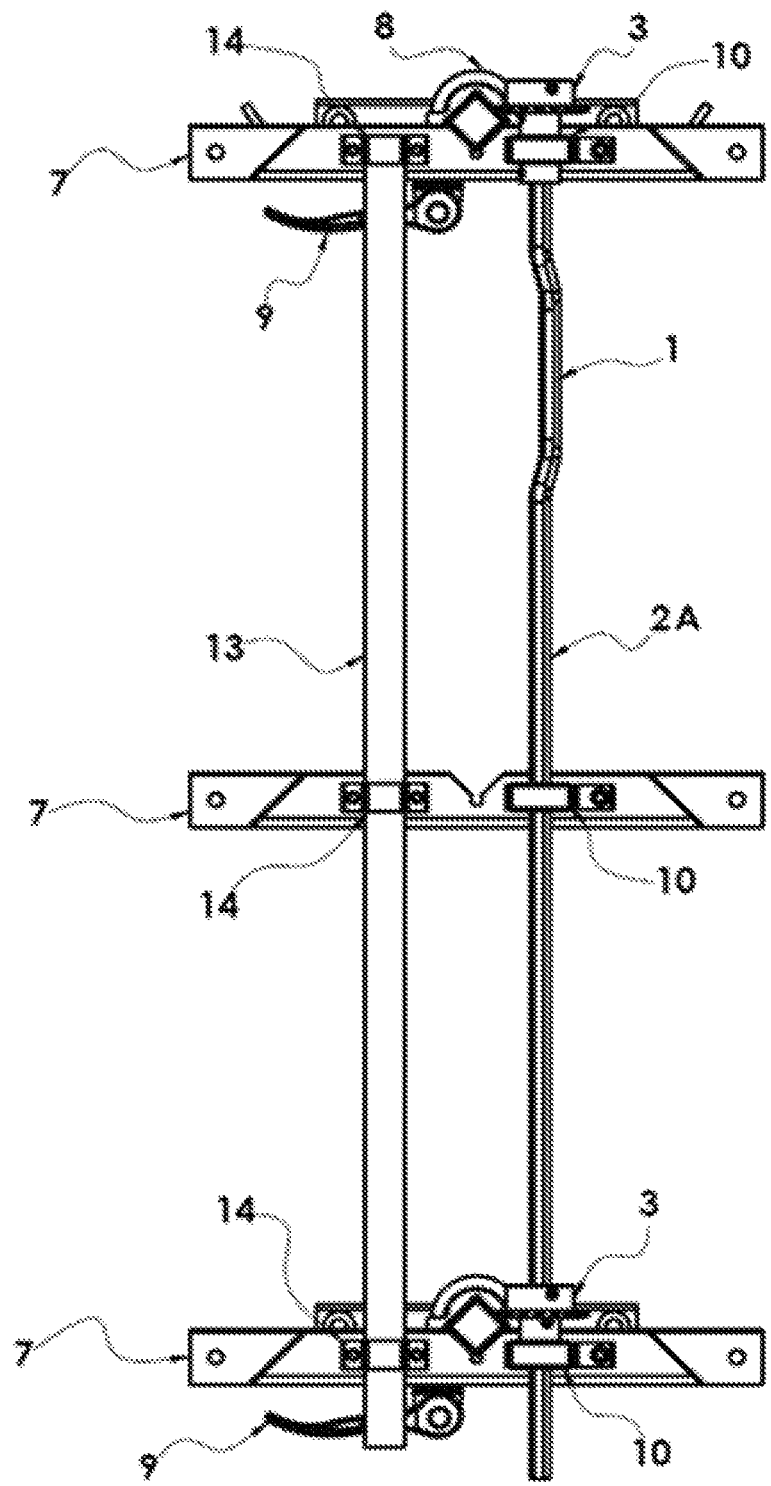
FIG. 2D illustrates a top down view of a ratchet mill assembly, in accordance with a second embodiment of the invention.

FIG. 2D illustrates a top down view of a ratchet mill assembly, in accordance with a second embodiment of the invention. This view is not to scale and includes a pinion sprocket 3 and depth post 4. The pinion sprocket 3 is fixed to the hex shaft 2A. The hex shaft 2A is free to rotate and is supported by bearing brackets 10 attached to each end bracket 7. Shown are a half U-bolt 8 and the toggle lock clamp 9. The handle bar 13 is connected to the end bracket 7 by way of the handle boss 14. The handle bend 1 allows the user to rotate the hex shaft 2A.

Figure 2E:
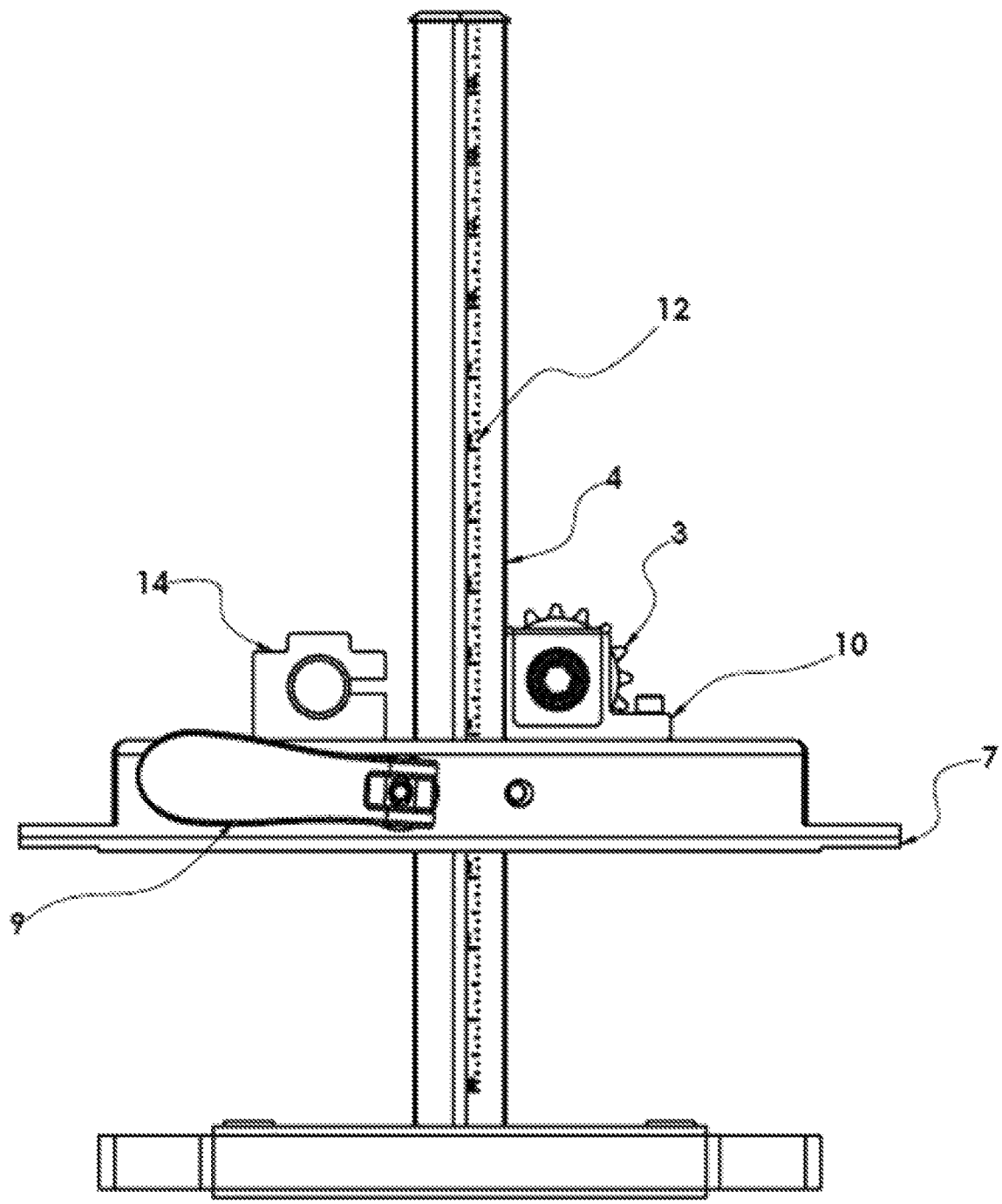
FIG. 2E illustrates a direct side view of the toggle lock clamp side of the ratchet mill assembly, in accordance with a second embodiment of the invention.

FIG. 2E illustrates a direct side view of the toggle lock clamp side of a rack and pinion assembly, in accordance with a second embodiment of the invention. This view is not to scale and includes a pinion sprocket 3, depth post 4, and depth markings 12. The bearing bracket 10 is attached to an end bracket 7, which also has a handle boss 14, and a toggle lock clamp 9. The pinion sprocket 3 engages the rack holes (not shown) on the depth post 4 in order to move the end bracket 7 up and down locations along the depth post 4.

Figure 3A:
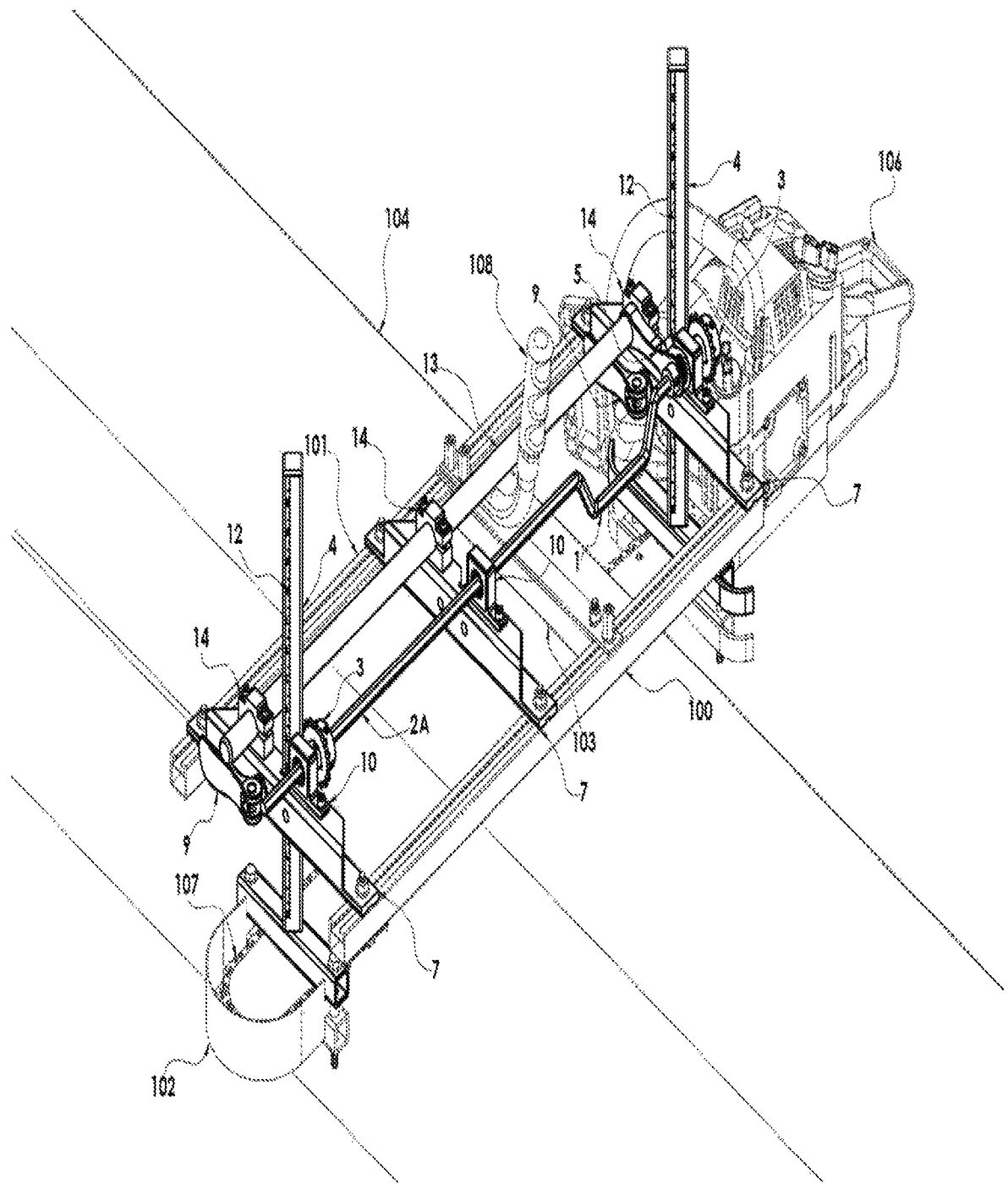
FIG. 3A illustrates a top-left isometric view of a ratchet mill assembly, in accordance with a third embodiment of the invention.

FIG. 3A illustrates a top-left isometric view of a ratchet mill assembly, in accordance with a third embodiment of the invention. This view is not to scale and includes a pinion sprocket 3, depth post 4, and depth markings 12. The pinion sprocket 3 is fixed to the hex shaft 2A. The hex shaft 2A is free to rotate and is supported by bearing brackets 10 attached to each end bracket 7. Depth post 4 is held in place between post clamp 6 and end bracket 7. The post clamp 6 is secured and tightened by way of a half U-bolt 8 and the toggle lock clamp 9. A ratchet lock linkage 5 is coupled to the hex shaft 2A and held from rotating by way of the handle bar 13. The handle bar 13 is connected to the end bracket 7 by way of the handle boss 14. The pinion sprocket 3 engages the rack holes (not shown) on the depth post 4 in order to move the end bracket 7 up and down locations along the depth post 4. The handle bend 1 allows the user to rotate the hex shaft 2A.

The environment outside of the invention (i.e., separate from the invention) is also shown in dotted lines in FIG. 3A. In dotted lines are shown a rail 100, a parallel rail 101, a U-shaped guard bend 102, a perpendicular cross-brace 103, wood to be cut 104, a chain saw 106, the chain saw blade 107, and a vertical handle 108. In one embodiment of the invention, in order to use this assembly for adjusting the height of the end bracket 7, the user disengages the toggle lock clamp 9 in order to release tension on the half U-bolt 8 and post clamp 6 which allows for free movement of the end bracket 7 in a vertical direction along the depth post 4. The user then grips the handle bend 1 and rotates the hex shaft 2A which in turn rotates the pinion sprocket 3, moving the end bracket 7 to the desired height location indicated by the depth markings 12. The ratchet lock linkage 5 allows the user to make incremental adjustments which hold their position, if the user releases his grip on the handle bend 1. The user then proceeds to reengage the toggle lock clamps 9, locking the end bracket 7 at the desired height. The assembly length is able to be adjusted by sliding the end brackets 7 closer together or father apart. For example, in one embodiment, the ratchet mill assembly can be adjusted by an operator (not shown) on the outside to take different sizes of chain saw blade 107 by loosening the screws and bolts on pinion sprocket 3 and the handle boss 14 and the nuts and bolts connecting the rails 100 and 101 to the end brackets 7.

Figure 3B:
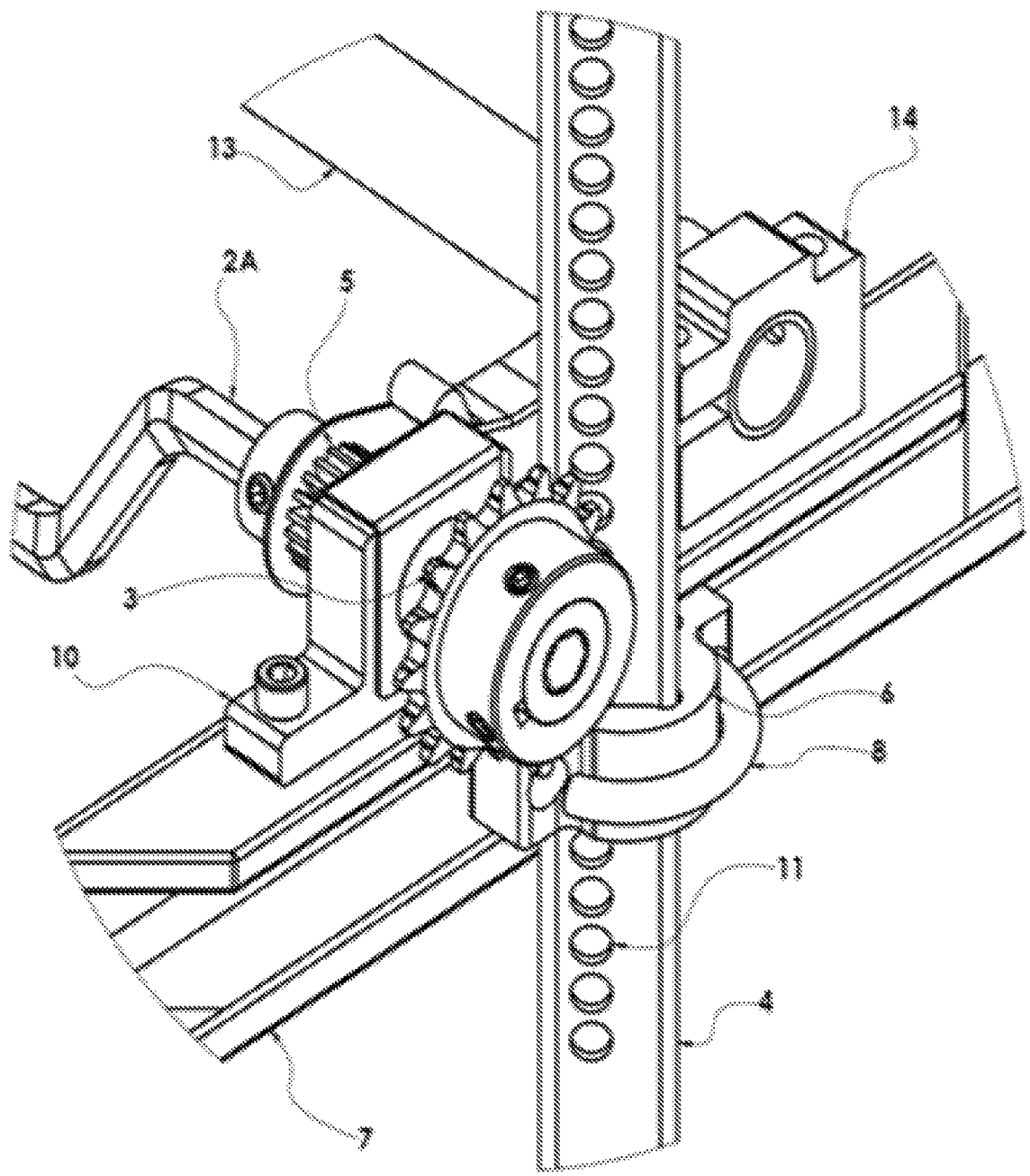
FIG. 3B illustrates a right-side magnified isometric view of a ratchet mill assembly in more detail, in accordance with a third embodiment of the invention.

FIG. 3B illustrates a right-side magnified isometric view of a ratchet mill assembly in more detail, in accordance with a third embodiment of the invention. This view in not to scale and includes a pinion sprocket 3, depth post 4, and rack holes 11. The pinion sprocket 3 is fixed to the hex shaft 2A. The hex shaft 2A is free to rotate and is supported by bearing brackets 10 attached to each end bracket 7. Depth post 4 is held in place between post clamp 6 and end bracket 7. The post clamp 6 is secured and tightened by way of a half U-bolt 8 and the toggle lock clamp 9. A ratchet lock linkage 5 is fixed to the hex shaft 2A and held from rotating by way of the handle bar 13. The handle bar 13 is connected to the end bracket 7 by way of the handle boss 14. The pinion sprocket 3 engages the rack holes 11 on the depth post 4 in order to move the end bracket 7 up and down locations along the depth post 4.

Figure 3C:
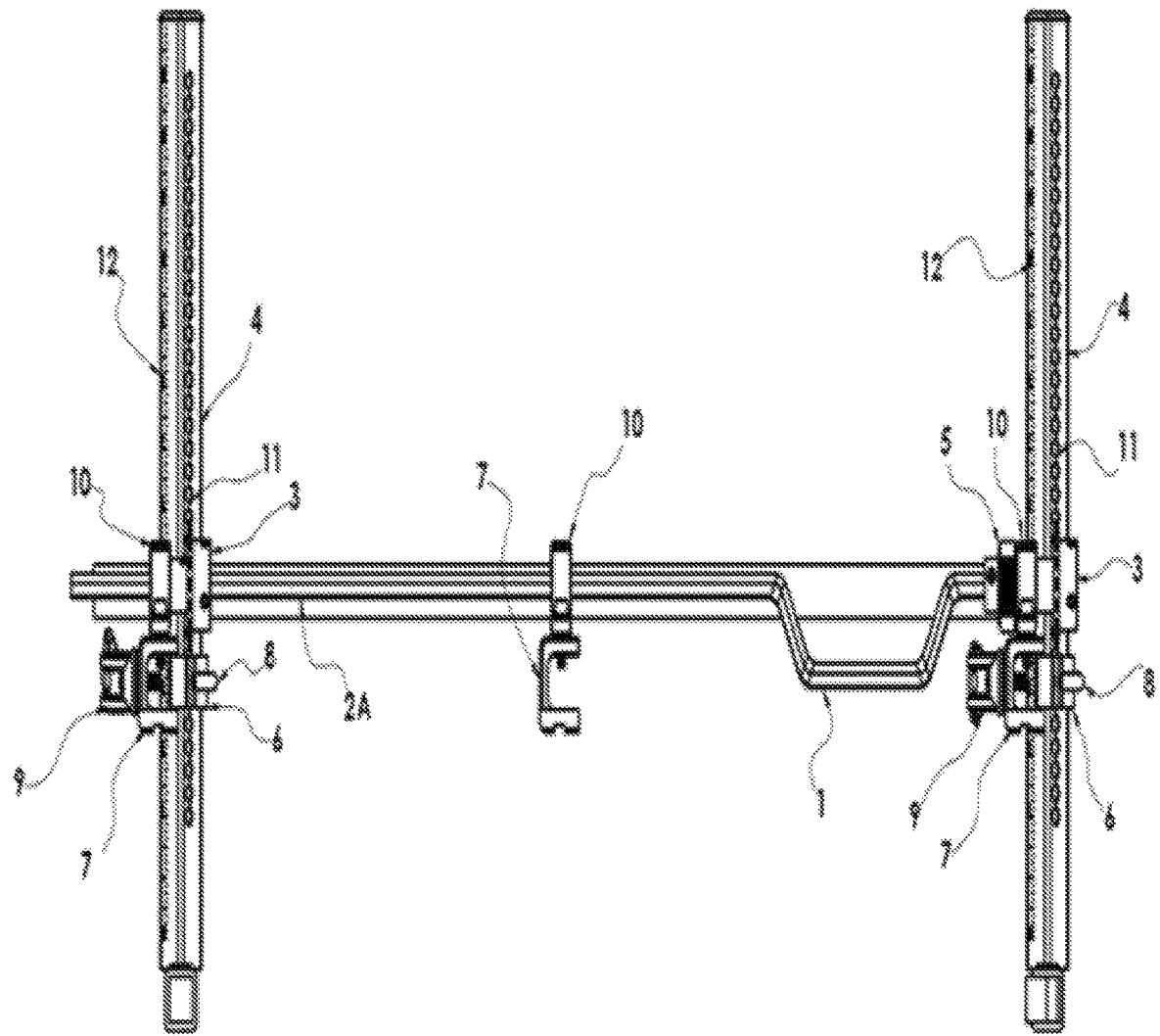
FIG. 3C illustrates a horizontal side view of a ratchet mill assembly, in accordance with a third embodiment of the invention.

FIG. 3C illustrates a horizontal side view of a ratchet mill assembly, in accordance with a third embodiment of the invention. This view is not to scale and includes a pinion sprocket 3, depth post 4, rack holes 11, and depth markings 12. The pinion sprocket 3 is fixed to the hex shaft 2A. The hex shaft 2A is free to rotate and is supported by bearing brackets 10 attached to each end bracket 7. Depth post 4 is held in place between post clamp 6 and end bracket 7. The post clamp 6 is secured and tightened by way of a half U-bolt 8 and the toggle lock clamp 9. A ratchet lock linkage 5 is fixed to the hex shaft 2A and held from rotating by way of the handle bar 13. The handle bar 13 is connected to the end bracket 7 by way of the handle boss 14. The pinion sprocket 3 engages the rack holes 11 on the depth post 4 in order to move the end bracket 7 up and down locations along the depth post 4. The handle bend 1 allows the user to rotate the hex shaft 2A.

Figure 3D:
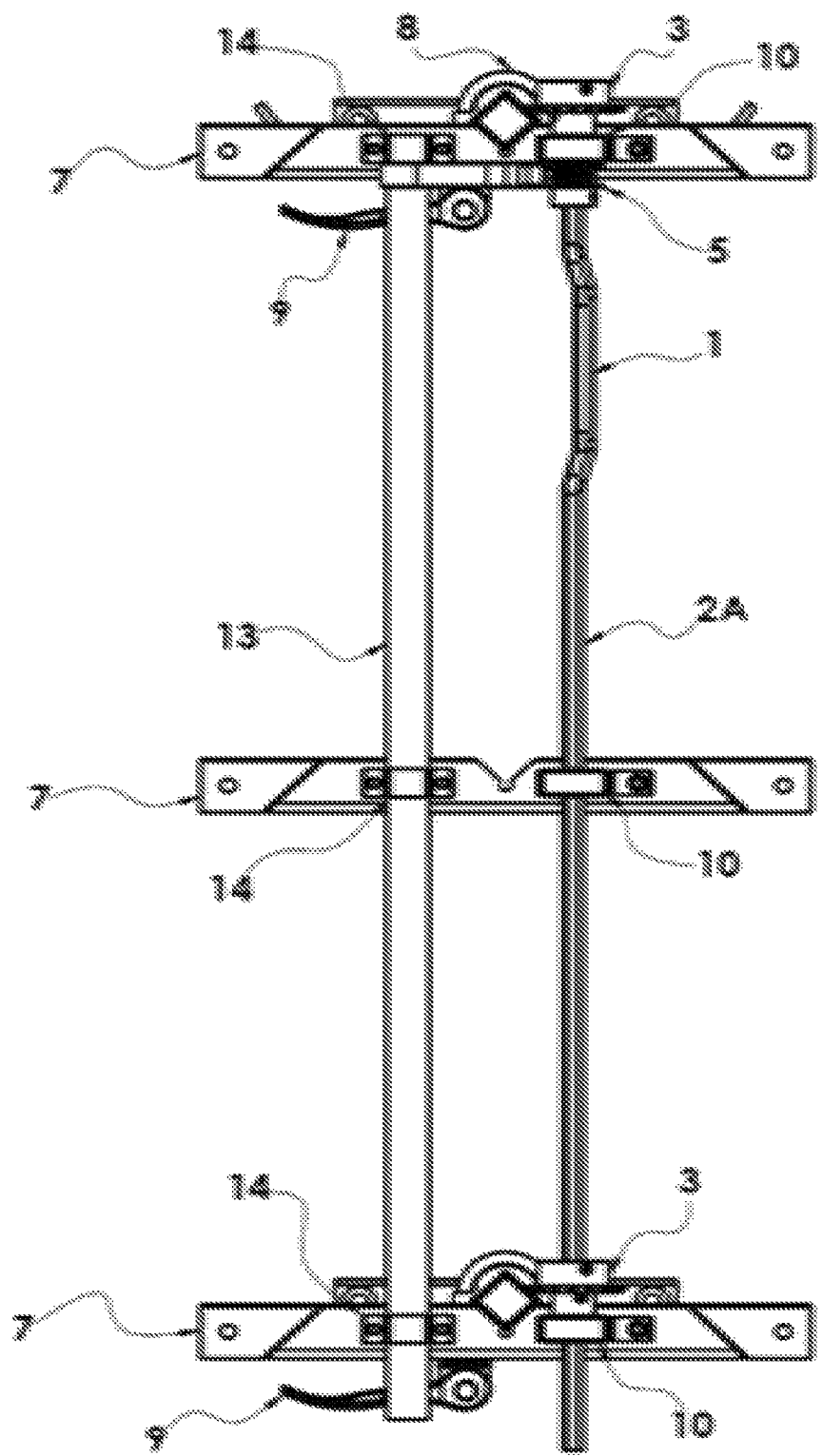
FIG. 3D illustrates a top down view of a ratchet mill assembly, in accordance with a third embodiment of the invention.

FIG. 3D illustrates a top down view of a ratchet mill assembly, in accordance with a third embodiment of the invention. This view is not to scale and includes a pinion sprocket 3 and depth post 4. The pinion sprocket 3 is fixed to the hex shaft 2A. The hex shaft 2A is free to rotate and is supported by bearing brackets 10 attached to each end bracket 7. Shown are a half U-bolt 8 and the toggle lock clamp 9. A ratchet lock linkage 5 is fixed to the hex shaft 2A and held from rotating by way of the handle bar 13. The handle bar 13 is connected to the end bracket 7 by way of the handle boss 14. The handle bend 1 allows the user to rotate the hex shaft 2A.

Figure 3E:
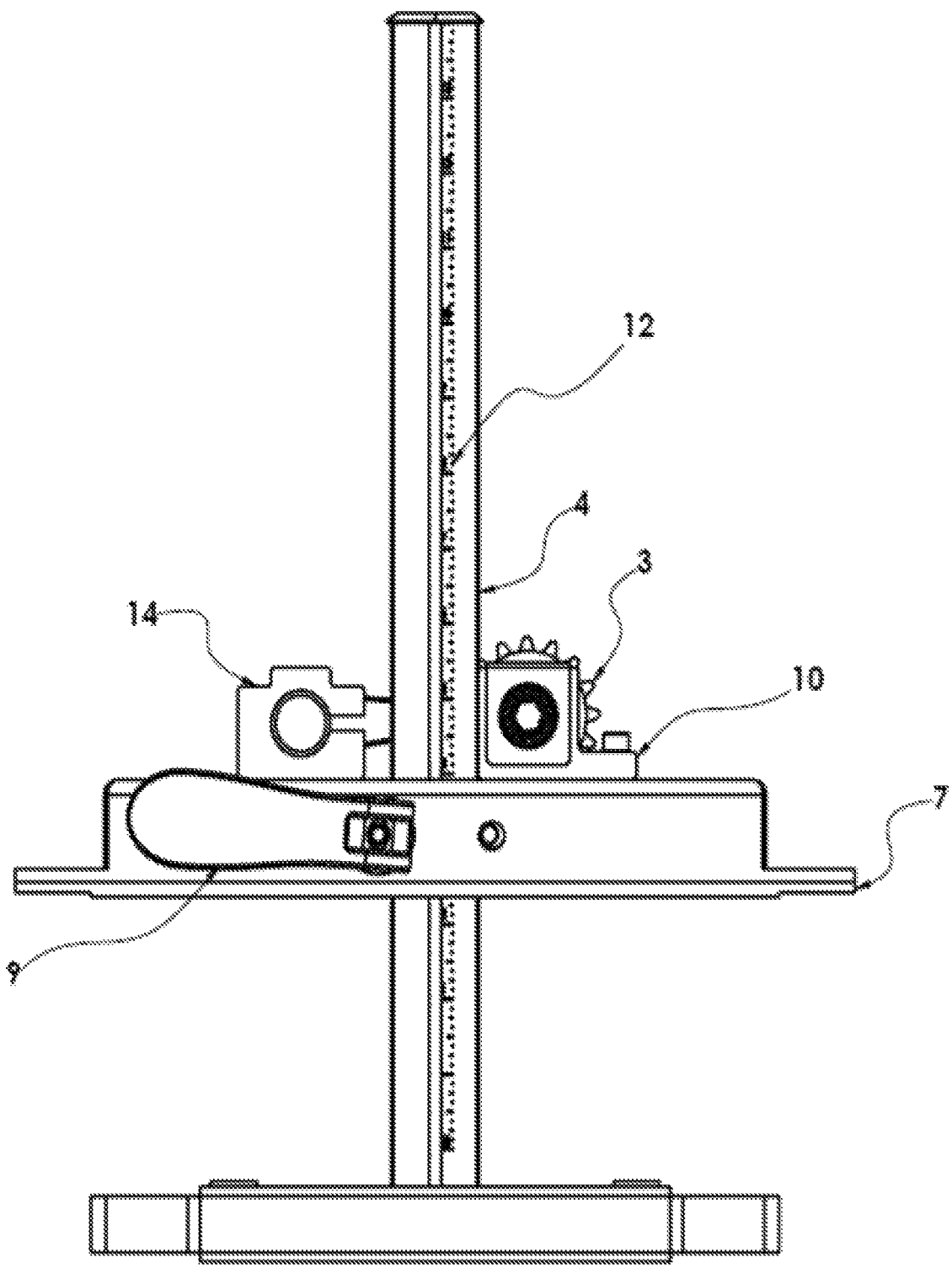
FIG. 3E illustrates a direct side view of the toggle lock clamp side of the ratchet mill assembly, in accordance with a third embodiment of the invention.

FIG. 3E illustrates a direct side view of the toggle lock clamp side of a rack and pinion assembly, in accordance with a third embodiment of the invention. This view is not to scale and includes a pinion sprocket 3, depth post 4, and depth markings 12. The bearing bracket 10 is attached to an end bracket 7, which also has a handle boss 14, and a toggle lock clamp 9. The pinion sprocket 3 engages the rack holes (not shown) on the depth post 4 in order to move the end bracket 7 up and down locations along the depth post 4.

Figure 4A:
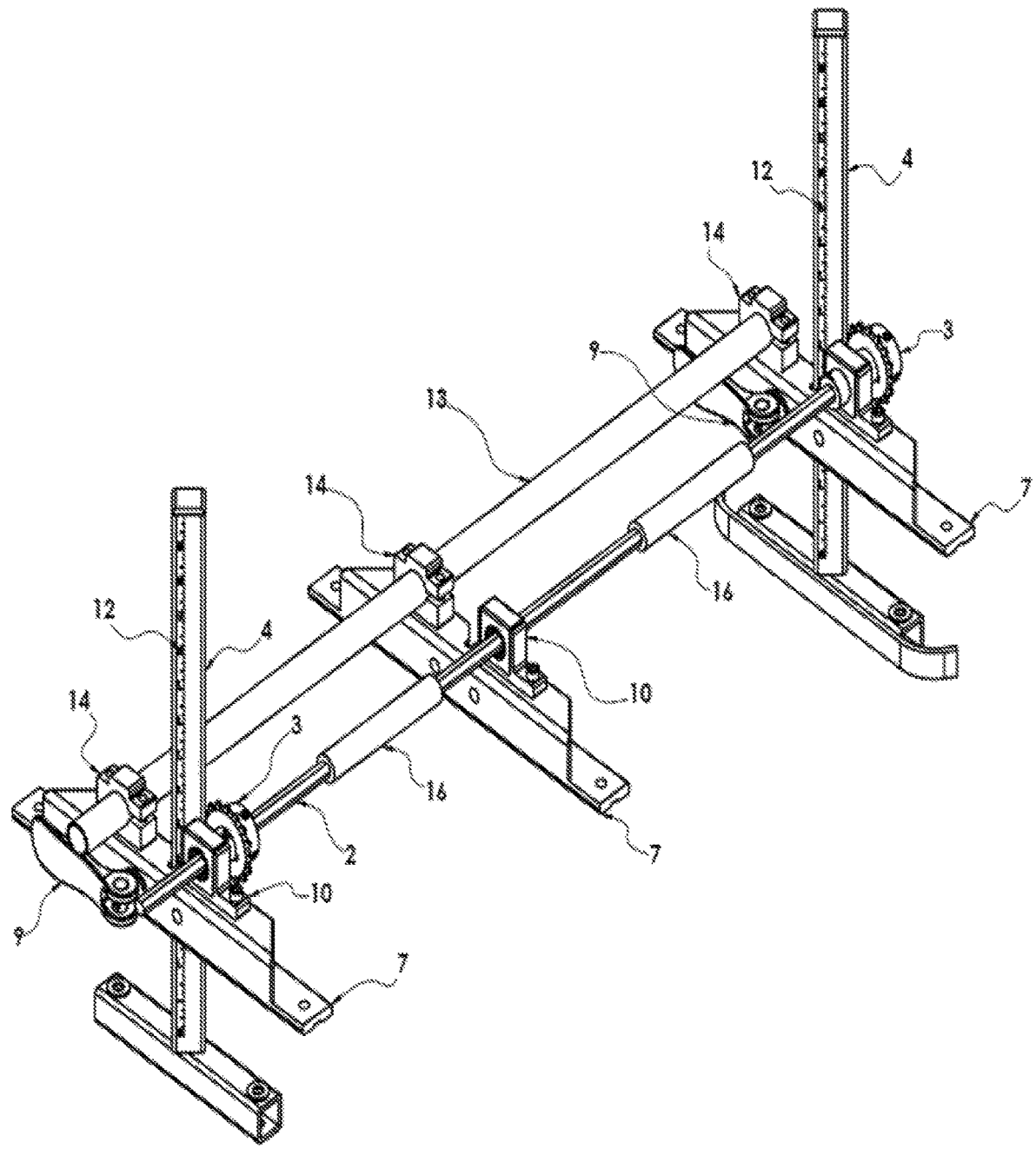
FIG. 4A illustrates a top-left isometric view of a ratchet mill assembly, in accordance with a fourth embodiment of the invention.

FIG. 4A illustrates a top-left isometric view of a ratchet mill assembly, in accordance with a fourth embodiment of the invention. This view is not to scale and includes a pinion sprocket 3, depth post 4, and depth markings 12. The pinion sprocket 3 is fixed to the hex shaft 2. The hex shaft 2 is free to rotate and is supported by bearing brackets 10 attached to each end bracket 7. Depth post 4 is held in place between post clamp 6 and end bracket 7. The post clamp 6 is secured and tightened by way of a half U-bolt 8 and the toggle lock clamp 9. The pinion sprocket 3 engages the rack holes (not shown) on the depth post 4 in order to move the end bracket 7 up and down locations along the depth post 4. The handle bar 13 is connected to the end bracket 7 by way of the handle boss 14. The coaxial handle grips 16 allow the user to rotate the hex shaft 2.

In one embodiment of the invention, in order to use this assembly for adjusting the height of the end bracket 7, the user disengages the toggle lock clamp 9 in order to release tension on the half U-bolt 8 and post clamp 6 which allows for free movement of the end bracket 7 in a vertical direction along the depth post 4. The user then grips the coaxial handle grips 16 and rotates the hex shaft 2 which in turn rotates the pinion sprocket 3, moving the end bracket 7 to the desired height location indicated by the depth markings 12. The user then proceeds to reengage the toggle lock clamps 9, locking the end bracket 7 at the desired height while holding the coaxial handle grips 16 at a fixed position. The assembly length is able to be adjusted by sliding the end brackets 7 closer together or father apart.

Figure 4B:
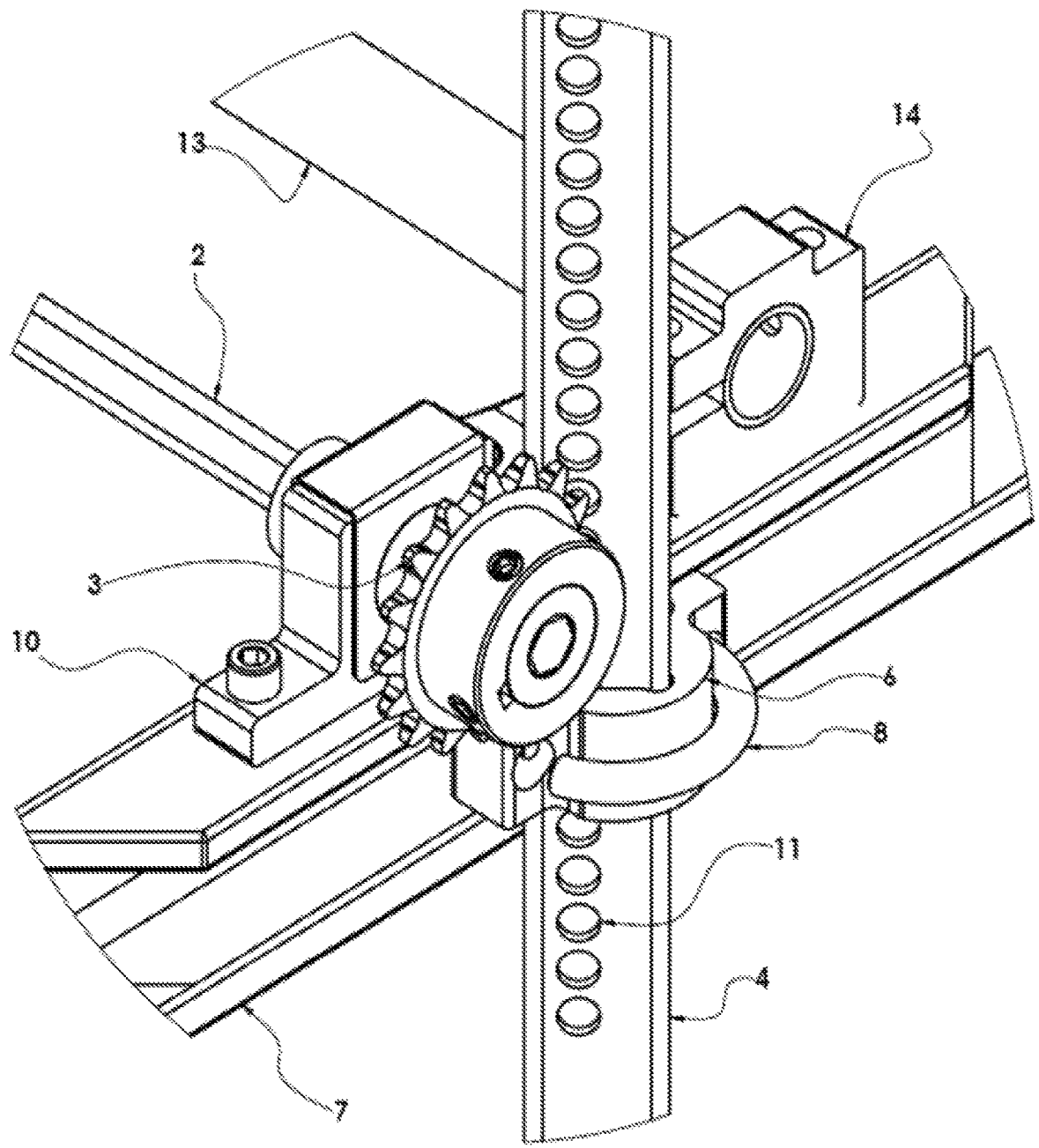
FIG. 4B illustrates a right-side magnified isometric view of a ratchet mill assembly in more detail, in accordance with a fourth embodiment of the invention.

FIG. 4B illustrates a right-side magnified isometric view of a ratchet mill assembly in more detail, in accordance with a fourth embodiment of the invention. This view in not to scale and includes a pinion sprocket 3, depth post 4, and rack holes 11. The pinion sprocket 3 is fixed to the hex shaft 2. The hex shaft 2 is free to rotate and is supported by bearing brackets 10 attached to each end bracket 7. Depth post 4 is held in place between post clamp 6 and end bracket 7. The post clamp 6 is secured and tightened by way of a half U-bolt 8 and the toggle lock clamp 9. The handle bar 13 is connected to the end bracket 7 by way of the handle boss 14. The pinion sprocket 3 engages the rack holes 11 on the depth post 4 in order to move the end bracket 7 up and down locations along the depth post 4.

Figure 4C:
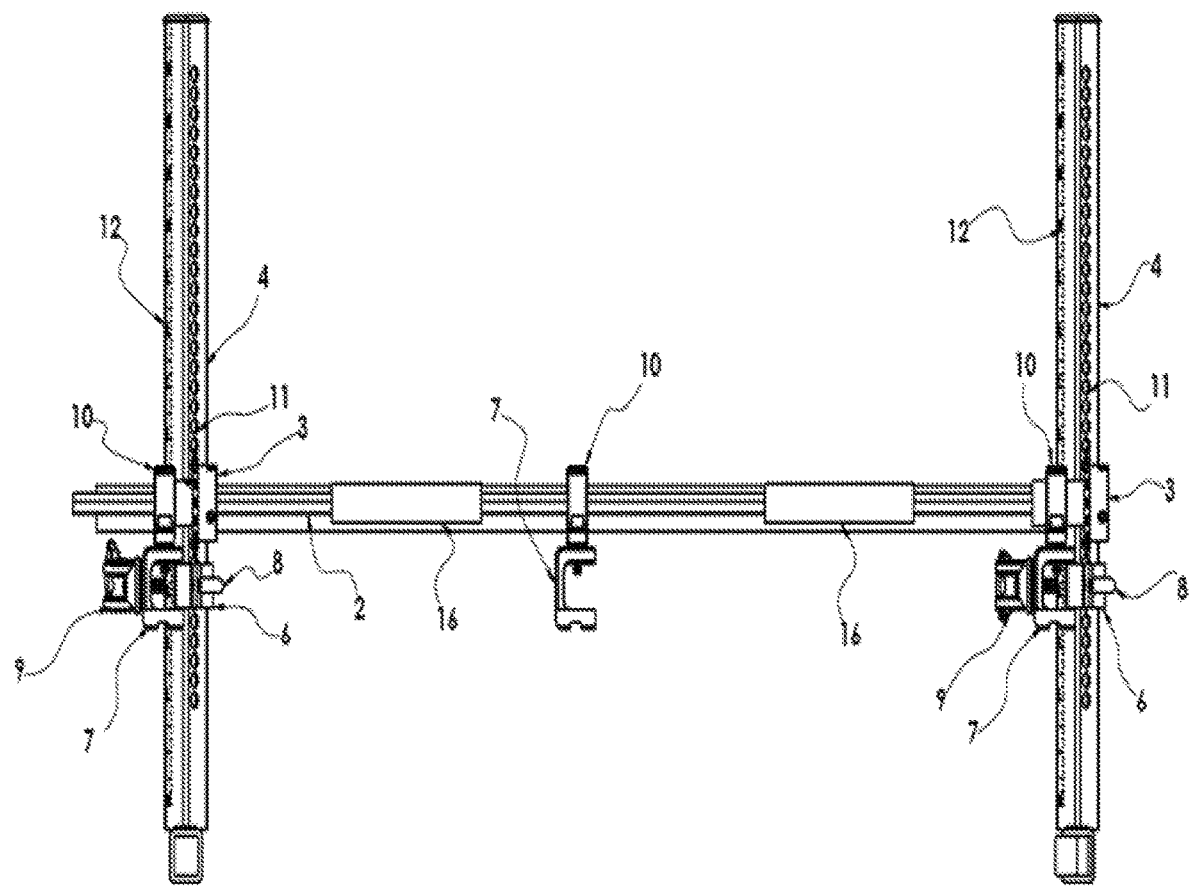
FIG. 4C illustrates a horizontal side view of a ratchet mill assembly, in accordance with a fourth embodiment of the invention.

FIG. 4C illustrates a horizontal side view of a ratchet mill assembly, in accordance with a fourth embodiment of the invention. This view is not to scale and includes a pinion sprocket 3, depth post 4, rack holes 11, and depth markings 12. The pinion sprocket 3 is fixed to the hex shaft 2. The hex shaft 2 is free to rotate and is supported by bearing brackets 10 attached to each end bracket 7. Depth post 4 is held in place between post clamp 6 and end bracket 7. The post clamp 6 is secured and tightened by way of a half U-bolt 8 and the toggle lock clamp 9. The handle bar 13 is connected to the end bracket 7 by way of the handle boss 14. The pinion sprocket 3 engages the rack holes 11 on the depth post 4 in order to move the end bracket 7 up and down locations along the depth post 4. The coaxial handle grips 16 allow the user to rotate the hex shaft 2.

Figure 4D:
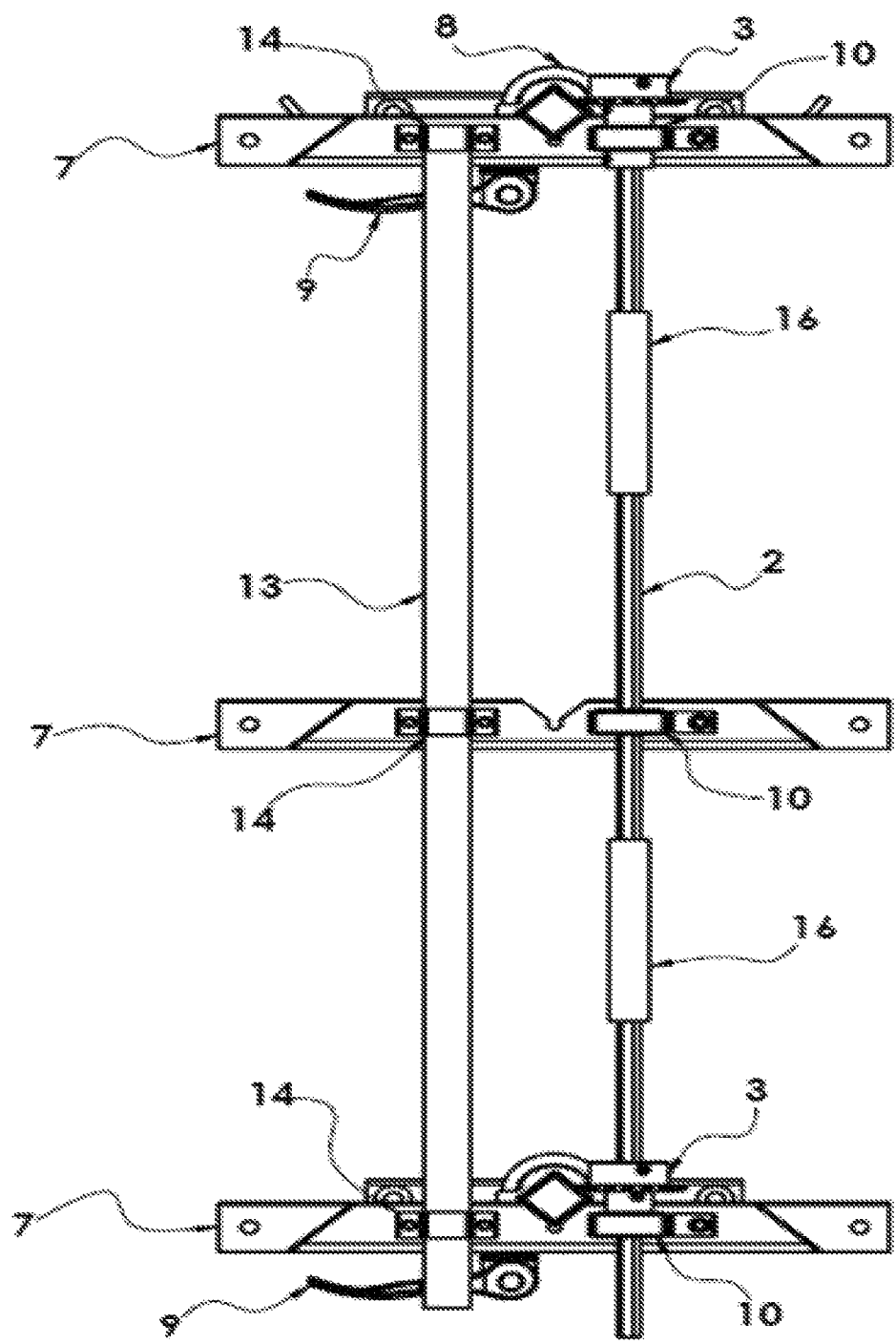
FIG. 4D illustrates a top down view of a ratchet mill assembly, in accordance with a fourth embodiment of the invention.

FIG. 4D illustrates a top down view of a ratchet mill assembly, in accordance with a fourth embodiment of the invention. This view is not to scale and includes a pinion sprocket 3 and depth post 4. The pinion sprocket 3 is fixed to the hex shaft 2. The hex shaft 2 is free to rotate and is supported by bearing brackets 10 attached to each end bracket 7. Shown are a half U-bolt 8 and the toggle lock clamp 9. The handle bar 13 is connected to the end bracket 7 by way of the handle boss 14. The coaxial handle grips 16 allow the user to rotate the hex shaft 2.

Figure 4E:
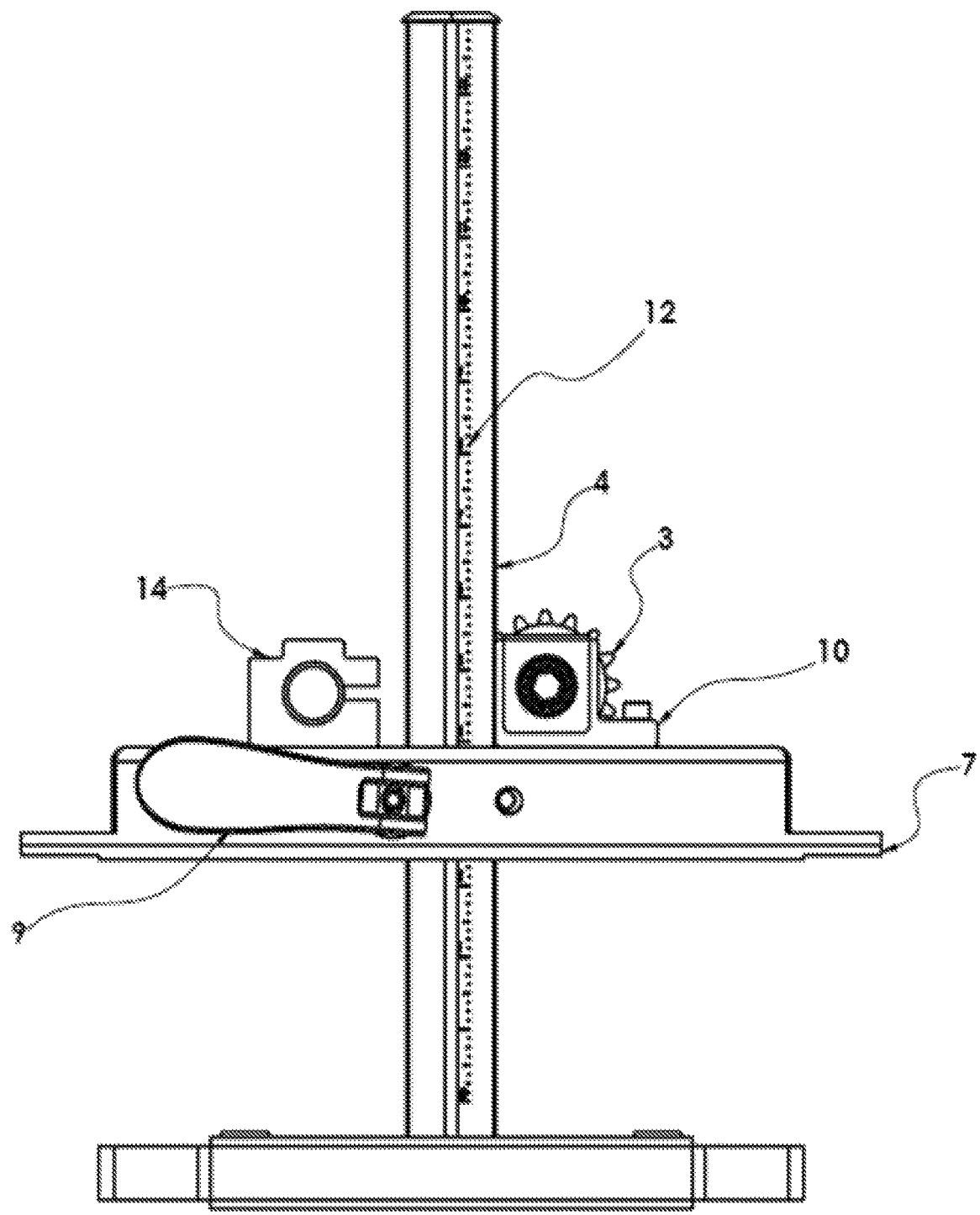
FIG. 4E illustrates a direct side view of the toggle lock clamp side of the ratchet mill assembly, in accordance with a fourth embodiment of the invention.

FIG. 4E illustrates a direct side view of the toggle lock clamp side of a rack and pinion assembly, in accordance with a fourth embodiment of the invention. This view is not to scale and includes a pinion sprocket 3, depth post 4, and depth markings 12. The bearing bracket 10 is attached to an end bracket 7, which also has a handle boss 14, and a toggle lock clamp 9. The pinion sprocket 3 engages the rack holes (not shown) on the depth post 4 in order to move the end bracket 7 up and down locations along the depth post 4.

Figure 5A:
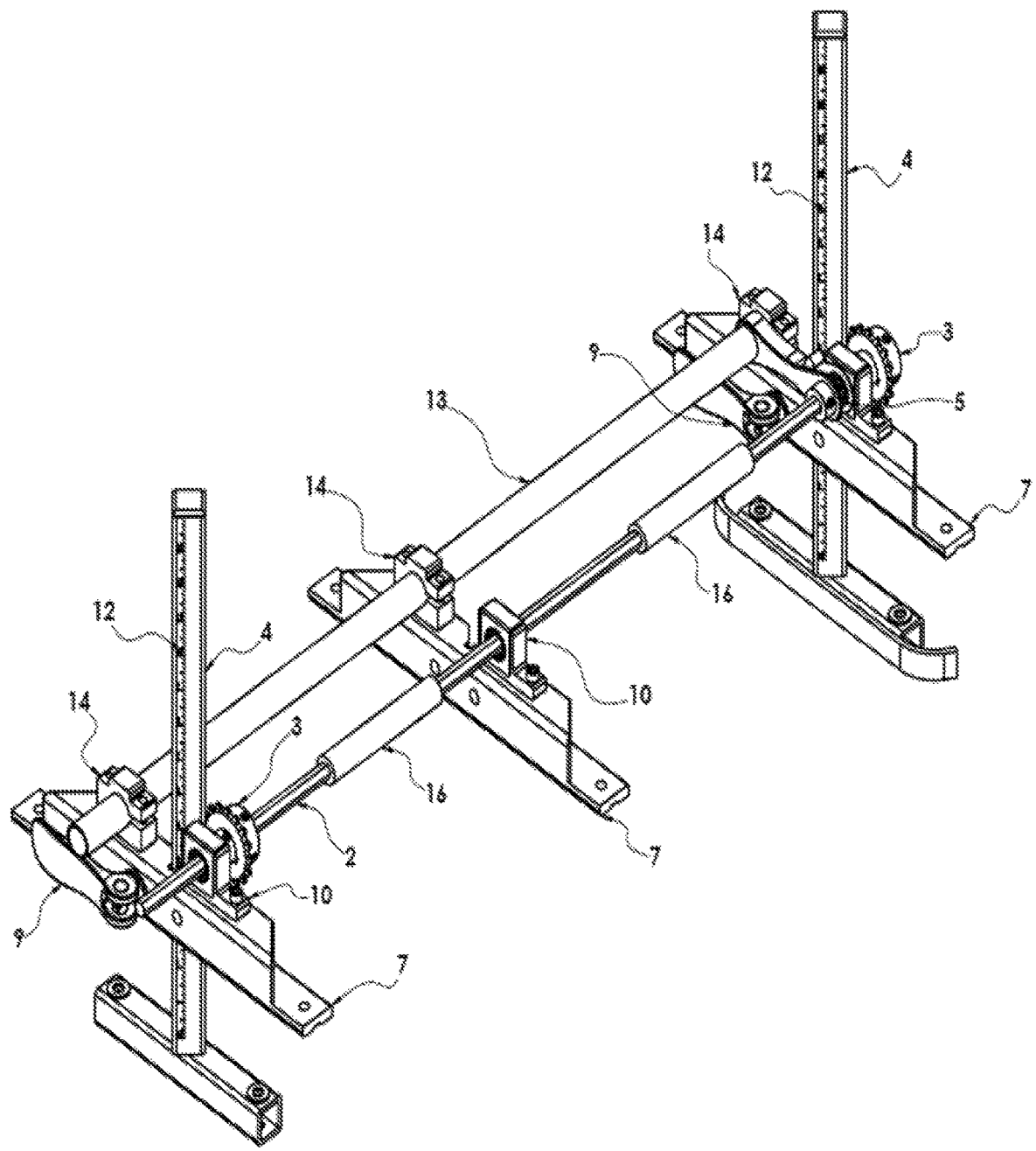
FIG. 5A illustrates a top-left isometric view of a ratchet mill assembly, in accordance with a fifth embodiment of the invention.

FIG. 5A illustrates a top-left isometric view of a ratchet mill assembly, in accordance with a fifth embodiment of the invention. This view is not to scale and includes a pinion sprocket 3, depth post 4, and depth markings 12. The pinion sprocket 3 is fixed to the hex shaft 2. The hex shaft 3 is free to rotate and is supported by bearing brackets 10 attached to each end bracket 7. Depth post 4 is held in place between post clamp 6 and end bracket 7. The post clamp 6 is secured and tightened by way of a half U-bolt 8 and the toggle lock clamp 9. A ratchet lock linkage 5 is fixed to the hex shaft 2 and held from rotating by way of the handle bar 13. The handle bar 13 is connected to the end bracket 7 by way of the handle boss 14. The pinion sprocket 3 engages the rack holes (not shown) on the depth post 4 in order to move the end bracket 7 up and down locations along the depth post 4. The coaxial handle grips 16 allow the user to rotate the hex shaft 2.

In one embodiment of the invention, in order to use this assembly for adjusting the height of the end bracket 7, the user disengages the toggle lock clamp 9 in order to release tension on the half U-bolt 8 and post clamp 6 which allows for free movement of the end bracket 7 in a vertical direction along the depth post 4. The user then grips the coaxial handle grips 16 and rotates the hex shaft 2 which in turn rotates the pinion sprocket 3, moving the end bracket 7 to the desired height location indicated by the depth markings 12. The ratchet lock linkage 5 allows the user to make incremental adjustments which hold their position, if the user releases his grip on the coaxial handle grips 16. The user then proceeds to reengage the toggle lock clamps 9, locking the end bracket 7 at the desired height. The assembly length is able to be adjusted by sliding the end brackets 7 closer together or father apart.

Figure 5B:
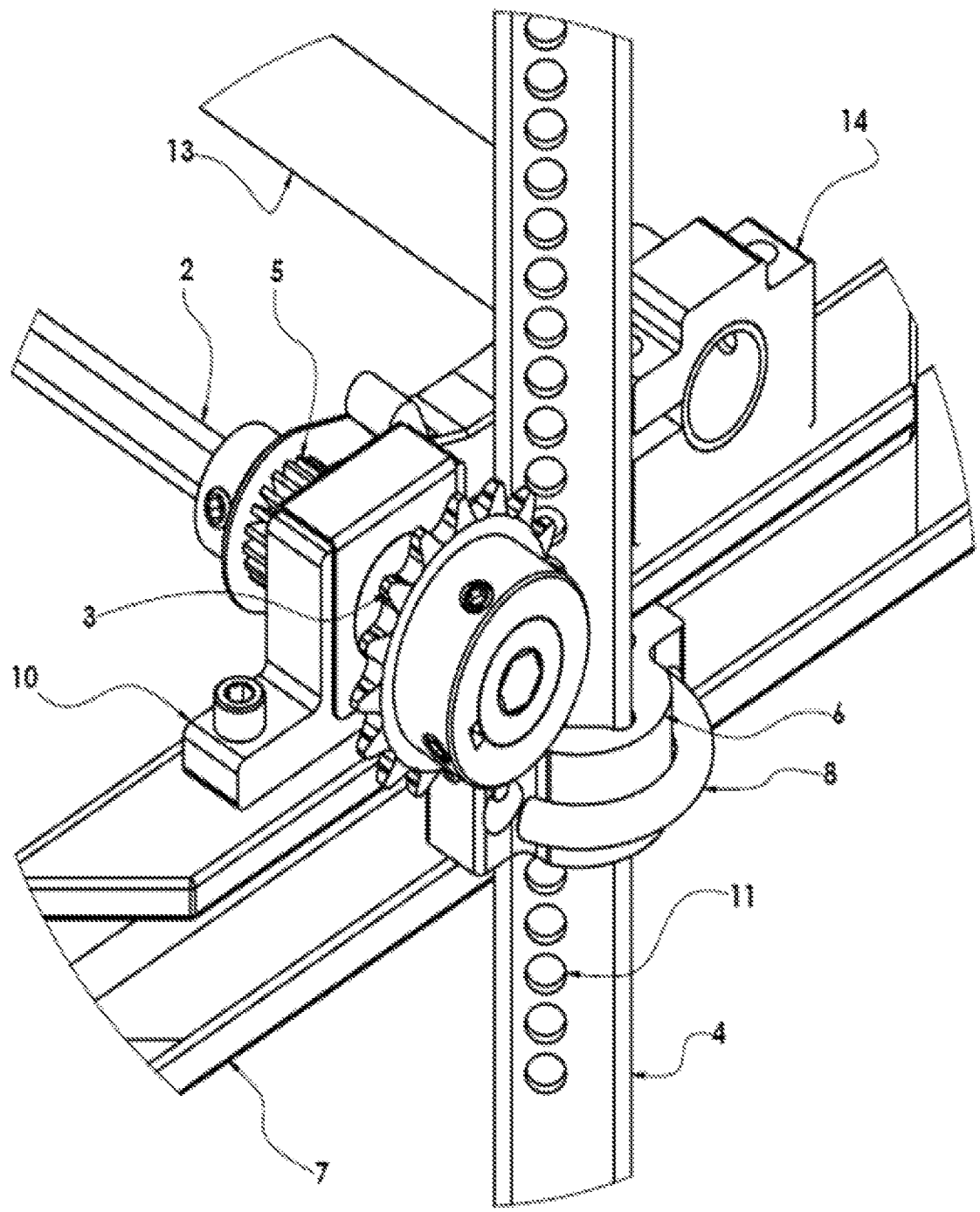
FIG. 5B illustrates a right-side magnified isometric view of a ratchet mill assembly in more detail, in accordance with a fifth embodiment of the invention.

FIG. 5B illustrates a right-side magnified isometric view of a ratchet mill assembly in more detail, in accordance with a fifth embodiment of the invention. This view in not to scale and includes a pinion sprocket 3, depth post 4, and rack holes 11. The pinion sprocket 3 is fixed to the hex shaft 2. The hex shaft 2 is free to rotate and is supported by bearing brackets 10 attached to each end bracket 7. Depth post 4 is held in place between post clamp 6 and end bracket 7. The post clamp 6 is secured and tightened by way of a half U-bolt 8 and the toggle lock clamp 9. A ratchet lock linkage 5 is fixed to the hex shaft 2 and held from rotating by way of the handle bar 13. The handle bar 13 is connected to the end bracket 7 by way of the handle boss 14. The pinion sprocket 3 engages the rack holes 11 on the depth post 4 in order to move the end bracket 7 up and down locations along the depth post 4.

Figure 5C:
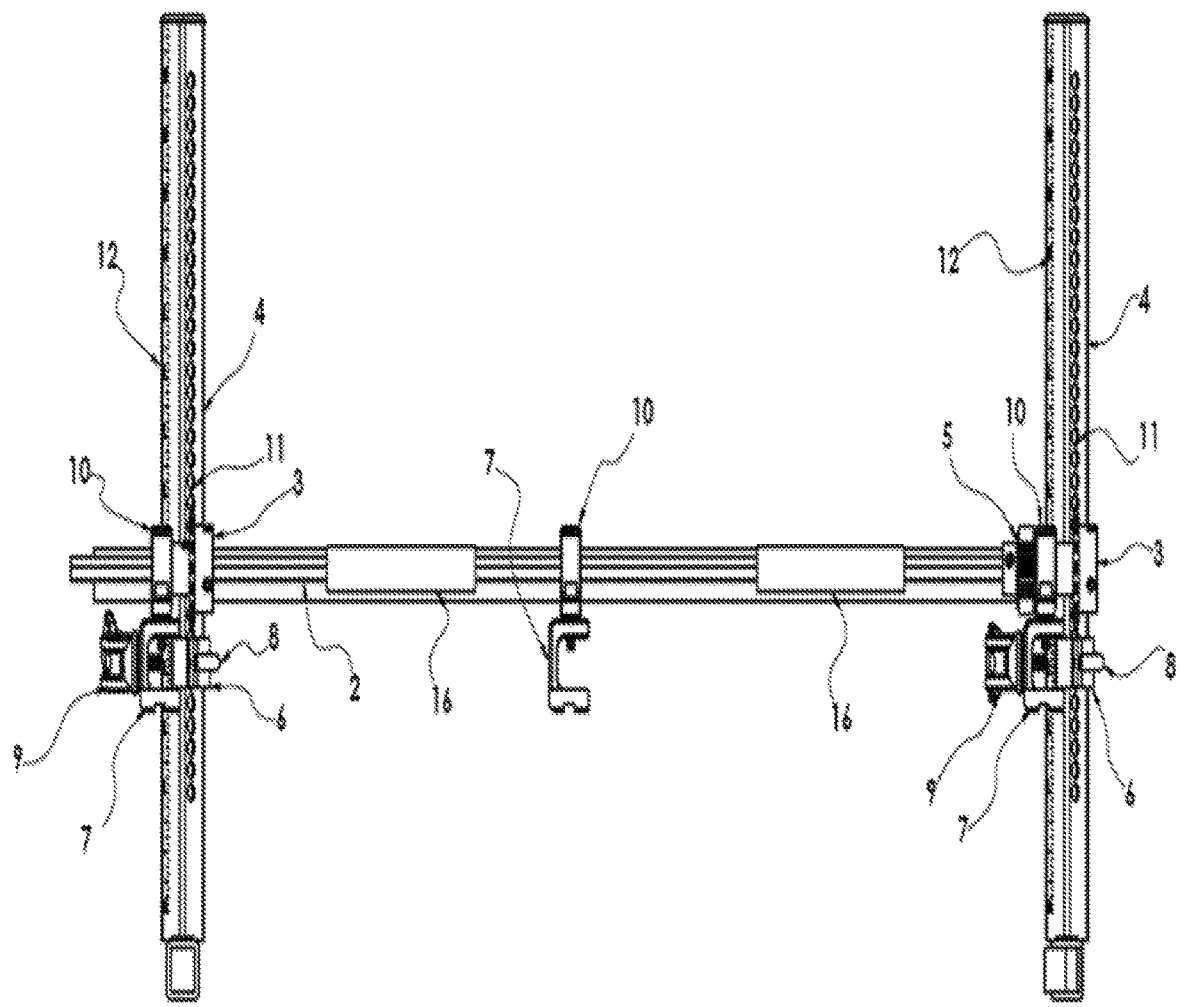
FIG. 5C illustrates a horizontal side view of a ratchet mill assembly, in accordance with a fifth embodiment of the invention.

FIG. 5C illustrates a horizontal side view of a ratchet mill assembly, in accordance with a fifth embodiment of the invention. This view is not to scale and includes a pinion sprocket 3, depth post 4, rack holes 11, and depth markings 12. The pinion sprocket 3 is fixed to the hex shaft 2. The hex shaft 2 is free to rotate and is supported by bearing brackets 10 attached to each end bracket 7. Depth post 4 is held in place between post clamp 6 and end bracket 7. The post clamp 6 is secured and tightened by way of a half U-bolt 8 and the toggle lock clamp 9. A ratchet lock linkage 5 is fixed to the hex shaft 2 and held from rotating by way of the handle bar 13. The handle bar 13 is connected to the end bracket 7 by way of the handle boss 14. The pinion sprocket 3 engages the rack holes 11 on the depth post 4 in order to move the end bracket 7 up and down locations along the depth post 4. The coaxial handle grips 16 allow the user to rotate the hex shaft 2.

Figure 5D:
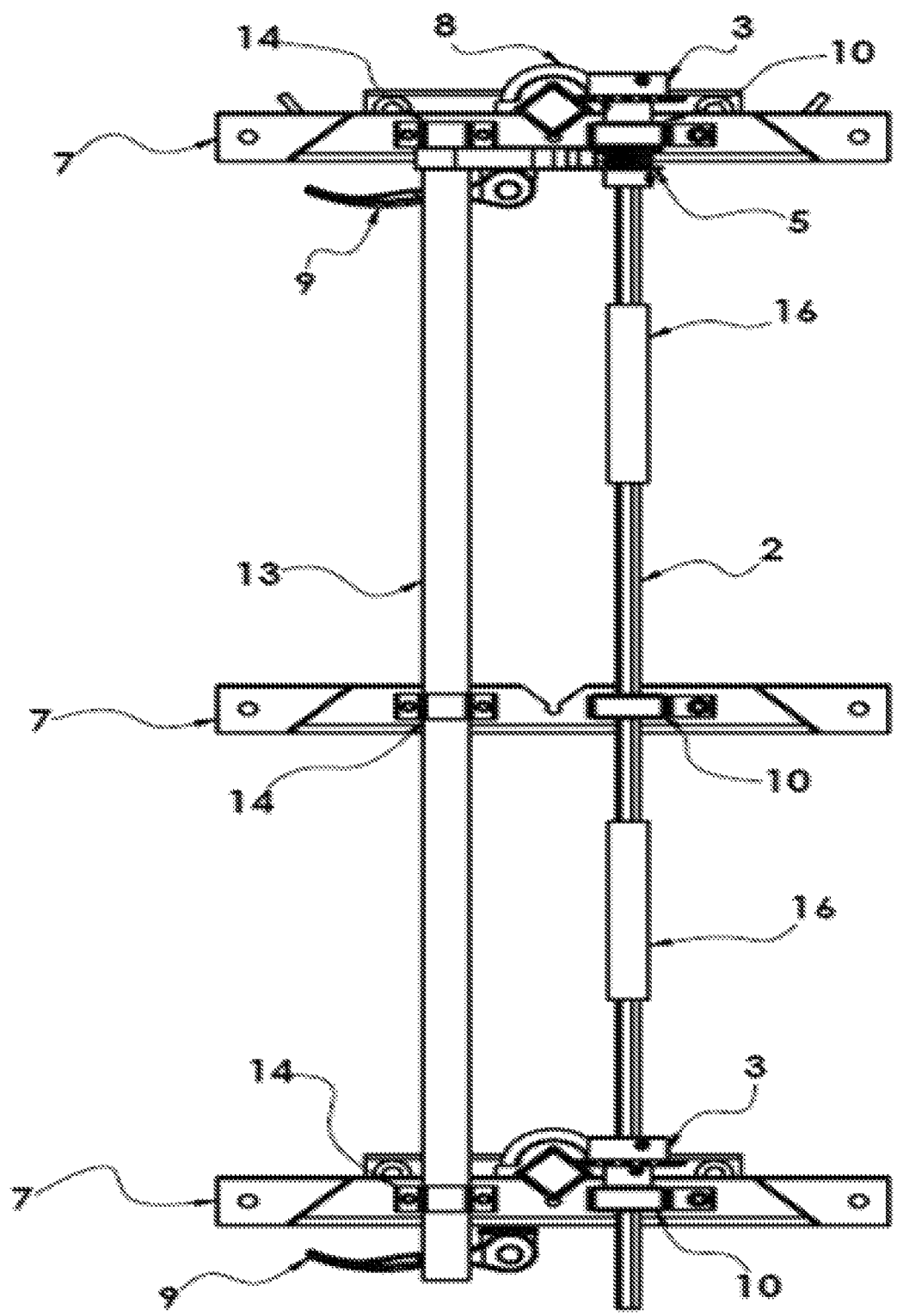
FIG. 5D illustrates a top down view of a ratchet mill assembly, in accordance with a fifth embodiment of the invention.

FIG. 5D illustrates a top down view of a ratchet mill assembly, in accordance with a fifth embodiment of the invention. This view is not to scale and includes a pinion sprocket 3 and depth post 4. The pinion sprocket 3 is fixed to the hex shaft 2. The hex shaft 2 is free to rotate and is supported by bearing brackets 10 attached to each end bracket 7. Shown are a half U-bolt 8 and the toggle lock clamp 9. A ratchet lock linkage 5 is fixed to the hex shaft 2 and held from rotating by way of the handle bar 13. The handle bar 13 is connected to the end bracket 7 by way of the handle boss 14. The coaxial handle grips 16 allow the user to rotate the hex shaft 2.

Figure 5E:
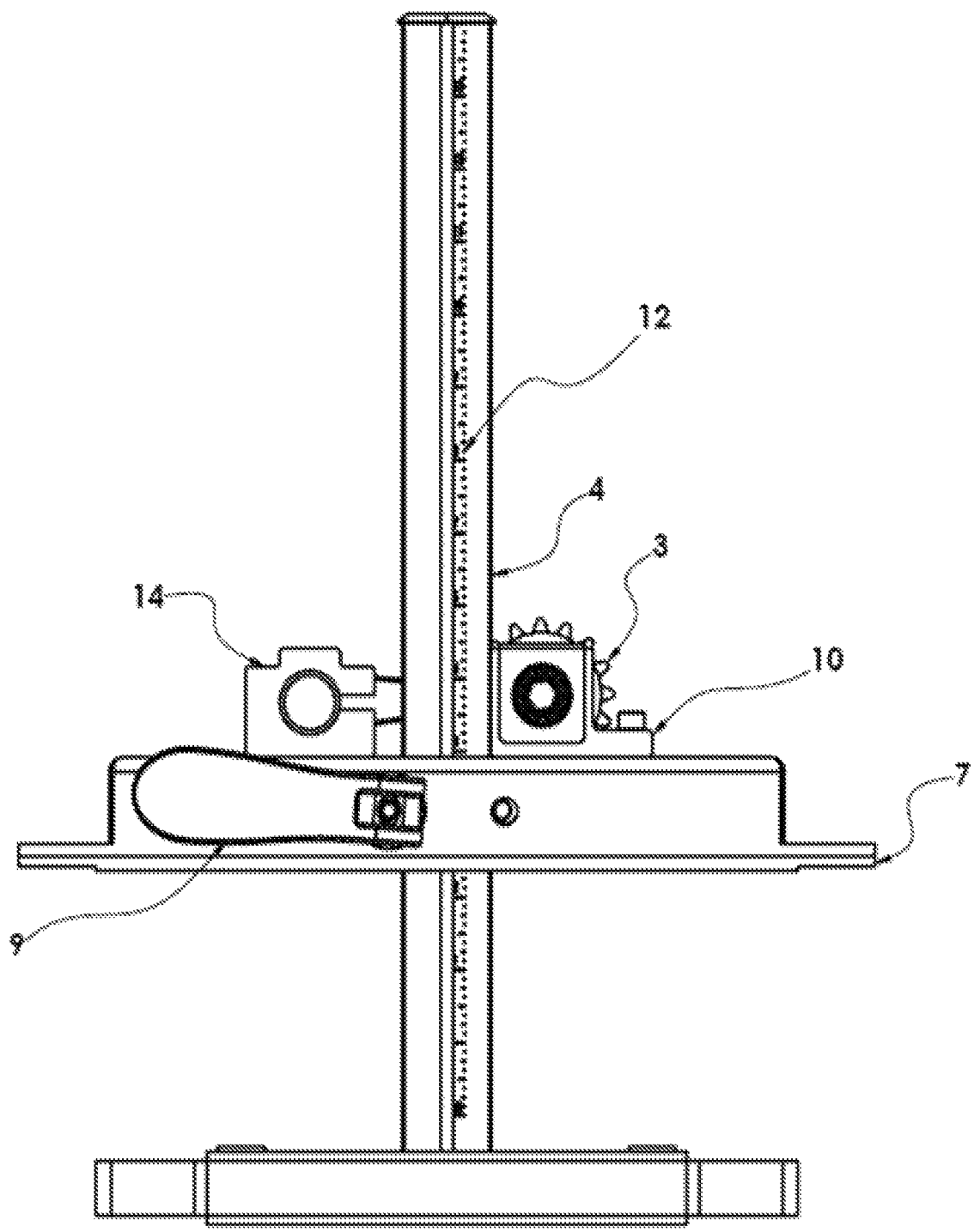
FIG. 5E illustrates a direct side view of the toggle lock clamp side of the ratchet mill assembly, in accordance with a fifth embodiment of the invention.

FIG. 5E illustrates a direct side view of the toggle lock clamp side of a rack and pinion assembly, in accordance with a fifth embodiment of the invention. This view is not to scale and includes a pinion sprocket 3, depth post 4, and depth markings 12. The bearing bracket 10 is attached to an end bracket 7, which also has a handle boss 14, and a toggle lock clamp 9. The pinion sprocket 3 engages the rack holes (not shown) on the depth post 4 in order to move the end bracket 7 up and down locations along the depth post 4.

Several embodiments of the invention are possible. The phrase "in one embodiment" used in the specification can refer to a new embodiment, a different embodiment disclosed elsewhere in the application, or the same embodiment disclosed earlier in the application. The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A ratchet mill assembly to permit repeatable horizontal cutting, the ratchet mill assembly comprising:
    a shaft with a polygonal cross-section, wherein the shaft with the polygonal cross-section is free to rotate when rotation is permitted and is supported by a plurality of bearing brackets, where each bearing bracket is attached to a respective end bracket of a plurality of end brackets;
    a handle which allows a user to rotate the shaft with the polygonal cross-section, wherein the shaft with the polygonal cross-section has a longitudinal axis and the handle has a longitudinal axis and the longitudinal axis of the handle is not parallel to the longitudinal axis of the shaft with the polygonal cross-section;
    a handle bar coupled to the plurality of end brackets by a plurality of handle bosses, each of the plurality of handle bosses on a respective end bracket of the plurality of end brackets;
    two pinion sprockets coupled to the shaft with the polygonal cross-section;
    a plurality of post clamps; and
    two depth posts, each of the depth posts having a plurality of depth markings, and each of the depth posts having a corresponding end bracket of the plurality of end brackets held in place at a location on the corresponding depth post by a respective one of the post clamps, wherein at least one of the post clamps is secured and tightened by way of a half U-bolt and a toggle lock clamp, wherein each of the pinion sprockets engages a plurality of rack holes on a respective one of the depth posts in order to allow movement of the corresponding end bracket up and down the respective one of the depth posts.

2. The ratchet mill assembly of claim 1, wherein the longitudinal axis of the handle is perpendicular to the longitudinal axis of the shaft with the polygonal cross-section.

3. The ratchet mill assembly of claim 1, further comprising a handle bend which extends from the shaft with polygonal cross-section to define the handle.

4. The ratchet mill assembly of claim 1, wherein the toggle lock clamp can be disengaged to allow vertical movement of one of the end brackets of the plurality of end brackets along one of the two depth posts, and rotation of the shaft with the polygonal cross-section rotates the two pinion sprockets to move two of the plurality of end brackets to desired locations along the two depth posts indicated by the plurality of depth markings on the two depth posts, and the toggle lock clamp can be reengaged to lock the one of the end brackets at a desired height while the shaft with the polygonal cross-section is held in a fixed position.

5. The ratchet mill assembly of claim 1, wherein at least two of the end brackets can be moved closer together or moved further apart from each other.

6. The ratchet mill assembly of claim 1, further comprising a ratchet lock linkage coupled to the shaft with the polygonal cross-section.

7. A ratchet mill assembly to permit repeatable horizontal cutting, the ratchet mill assembly comprising:
    a hex shaft, wherein the hex shaft is free to rotate when rotation is permitted and is supported by a plurality of bearing brackets, where each bearing bracket is attached to a respective end bracket of a plurality of end brackets;
    a handle which allows a user to rotate the hex shaft, wherein the hex shaft has a longitudinal axis and the handle has a longitudinal axis and the longitudinal axis of the handle is not parallel to the longitudinal axis of the hex shaft;
    a handle bar coupled to the plurality of end brackets by a respective handle boss on each of the end brackets;
    two pinion sprockets coupled to the hex shaft;
    a plurality of post clamps; and
    two depth posts, each of the depth posts having a plurality of depth markings, and each of the depth posts having a corresponding end bracket of the plurality of end brackets held in place at a location on the corresponding depth post by a respective one of the post clamps, wherein at least one of the post clamps is secured and tightened by way of a half U-bolt and a toggle lock clamp, wherein each of the pinion sprockets engages a plurality of rack holes on a respective one of the depth posts in order to allow movement of the corresponding end bracket up and down the respective one of the depth posts.

8. The ratchet mill assembly of claim 7, wherein the longitudinal axis of the handle is perpendicular to the longitudinal axis of the hex shaft.

9. The ratchet mill assembly of claim 7 further comprising a handle bend which extends from the hex shaft to define the handle.

10. The ratchet mill assembly of claim 7, wherein the toggle lock clamp can be disengaged to allow vertical movement of one of the end brackets of the plurality of end brackets along one of the two depth posts, and rotation of the hex shaft rotates the two pinion sprockets to move two of the plurality of end brackets to desired locations along the two depth posts indicated by the plurality of depth markings on the two depth posts, and the toggle lock clamp can be reengaged to lock the one of the end brackets at a desired height while the hex shaft is held in a fixed position.

11. The ratchet mill assembly of claim 7, wherein at least two of the end brackets can be moved closer together or moved further apart from each other.

12. The ratchet mill assembly of claim 7, further comprising a ratchet lock linkage coupled to the hex shaft.

13. A ratchet mill assembly to permit repeatable horizontal cutting, the ratchet mill assembly comprising:
- a hex shaft, wherein the hex shaft is free to rotate when rotation is permitted and is supported by a plurality of bearing brackets, where each bearing bracket is attached to a respective end bracket of a plurality of end brackets;
- a handle which allows a user to rotate the hex shaft, wherein the hex shaft has a longitudinal axis and the handle has a longitudinal axis and the longitudinal axis of the handle is not parallel to the longitudinal axis of the hex shaft;
- a handle bar coupled to the plurality of end brackets by a respective handle boss on each of the end brackets;
- a ratchet lock linkage coupled to the hex shaft;
- two pinion sprockets coaxially coupled to the hex shaft;
- a plurality of post clamps; and
- two depth posts, each of the depth posts having a plurality of depth markings, and each of the depth posts having a corresponding end bracket of the plurality of end brackets held in place at a location on the corresponding depth post by a respective one of the post clamps, wherein at least one of the post clamps is secured and tightened by way of a half U-bolt and a toggle lock clamp, wherein each of the pinion sprockets engages a plurality of rack holes on a respective one of the depth posts in order to allow movement of the corresponding end bracket up and down the respective one of the depth posts.

14. The ratchet mill assembly of claim 13, wherein the longitudinal axis of the handle is perpendicular to the longitudinal axis of the hex shaft.

15. The ratchet mill assembly of claim 13, further comprising a handle bend which extends from the hex shaft to define the handle.

16. The ratchet mill assembly of claim 13, wherein the toggle lock clamp can be disengaged to allow vertical movement of one of the end brackets of the plurality of end brackets along one of the two depth posts, and rotation of the hex shaft rotates the two pinion sprockets to move two of the plurality of end brackets to desired locations along the two depth posts indicated by the plurality of depth markings on the two depth posts, and the toggle lock clamp can be reengaged to lock the one of the end brackets at a desired height while the hex shaft is held in a fixed position.

17. The ratchet mill assembly of claim 13, wherein each of the end brackets is fabricated from extruded metal including aluminum.

* * * * *